United States Patent
Sato

(10) Patent No.: US 7,926,354 B2
(45) Date of Patent: Apr. 19, 2011

(54) SEMICONDUCTOR PRESSURE SENSOR AND METHOD OF PRODUCING THE SAME

(75) Inventor: Kimitoshi Sato, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 81 days.

(21) Appl. No.: 12/542,921

(22) Filed: Aug. 18, 2009

(65) Prior Publication Data

US 2010/0242618 A1    Sep. 30, 2010

(30) Foreign Application Priority Data

Mar. 24, 2009 (JP) ................................. 2009-071450

(51) Int. Cl.
*G01L 9/06* (2006.01)
(52) U.S. Cl. ............... 73/754; 73/727; 257/415; 438/50
(58) Field of Classification Search .................. None
See application file for complete search history.

(56) References Cited

U.S. PATENT DOCUMENTS

| | | | | |
|---|---|---|---|---|
| 5,622,901 | A * | 4/1997 | Fukada ................ | 438/50 |
| 2005/0172724 | A1* | 8/2005 | Sakai et al. ............ | 73/754 |
| 2009/0140355 | A1* | 6/2009 | Izuo et al. ............. | 257/415 |
| 2009/0146230 | A1* | 6/2009 | Takizawa .............. | 257/419 |
| 2010/0083765 | A1* | 4/2010 | Yoneda et al. ......... | 73/721 |
| 2010/0083766 | A1* | 4/2010 | Yoneda et al. ......... | 73/721 |
| 2010/0218611 | A1* | 9/2010 | Sato .................... | 73/708 |
| 2010/0219490 | A1* | 9/2010 | Adachi et al. ......... | 257/418 |
| 2010/0270629 | A1* | 10/2010 | Tokuda et al. ........ | 257/415 |

FOREIGN PATENT DOCUMENTS

| | | |
|---|---|---|
| JP | 3-6824 | 1/1991 |
| JP | 5-343705 | 12/1993 |
| JP | 10-22511 | 1/1998 |
| JP | 2000-249613 | 9/2000 |
| JP | 2001-304995 | 10/2001 |
| JP | 2003-332586 | 11/2003 |

OTHER PUBLICATIONS

U.S. Appl. No. 12/846,072, filed Jul. 29, 2010, Sato et al.
U.S. Appl. No. 12/542,960, filed Aug. 18, 2009, Sato.

* cited by examiner

*Primary Examiner* — Andre J Allen
(74) *Attorney, Agent, or Firm* — Oblon, Spivak, McClelland, Maier & Neustadt, L.L.P.

(57) ABSTRACT

A diaphragm made of a polysilicon film is provided above a first main surface of a silicon substrate. Four gauge resistors are provided on the top face of the diaphragm. A through hole for exposing the bottom face of the diaphragm is formed in the silicon substrate. An anchor portion for mounting the diaphragm on the silicon substrate is provided between the diaphragm and the silicon substrate in a manner surrounding circumferentially an opening end of the through hole located at the side facing the first main surface. Accordingly, a semiconductor pressure sensor having a diaphragm of reduced and less varied thickness can be obtained.

13 Claims, 29 Drawing Sheets

SEMICONDUCTOR PRESSURE SENSOR AND METHOD OF PRODUCING THE SAME

BACKGROUND OF THE INVENTION

1. Field of the Invention

The present invention relates to a semiconductor pressure sensor and a method of producing the same, and more particularly relates to a semiconductor pressure sensor having bridged gauge resistors and a method of producing such a semiconductor pressure sensor.

2. Description of the Background Art

One form of pressure sensors is a semiconductor pressure sensor to which a semiconductor substrate is applied. This semiconductor pressure sensor includes a plurality of diffused resistors to constitute gauge resistors, formed on the surface of a silicon substrate. These diffused resistors are bridged by diffused wiring layers having a low resistance. For example, the gauge resistors are located respectively on the four sides of a predetermined region to constitute a rectangular diaphragm. The silicon substrate has formed on its back surface recesses depressed toward the predetermined region of the front surface. This type of semiconductor pressure sensor is disclosed in, for example, Japanese Patent Laying-Open No. 03-0006824.

However, conventional semiconductor pressure sensors have the following drawbacks. The recesses in the back surface of the silicon substrate depressed toward the predetermined region to constitute a diaphragm are formed by polishing the substrate to a predetermined thickness, and further by etching the back surface of the silicon substrate with a predetermined etching mask interposed.

Accordingly, the diaphragm is controlled in thickness by the etching time, causing the problem in that the diaphragm is likely to vary in thickness in the region to constitute the diaphragm. In addition, even if the diaphragm is to be reduced in thickness, the thickness is restricted to a lower limit of about 10 μm, considering variations in the amount of polishing of the silicon substrate and the amount of etching in the surface of the silicon substrate. There is another problem in that variations in the amount of etching of the silicon substrate cause the recesses to be displaced with respect to the gauge resistors provided for the diaphragm.

SUMMARY OF THE INVENTION

The present invention was made to solve the above-described problems resulting from etching of the silicon substrate. An object of the present invention is to provide a semiconductor pressure sensor including a diaphragm of reduced and less varied thickness. Another object of the present invention is to provide a method of producing such a semiconductor pressure sensor.

A semiconductor pressure sensor according to the present invention includes a substrate, a diaphragm, a gauge resistor, a through hole and an anchor portion. The substrate has a first main surface and a second main surface opposite to each other. The diaphragm is provided above the first main surface of the substrate, and made of a predetermined film. The gauge resistor senses strain in the diaphragm as a variation in electric resistance. The through hole extends through the substrate from the second main surface to the first main surface in a manner exposing a bottom face of the diaphragm. The anchor portion is made of an identical material to the predetermined film, and surrounds circumferentially an opening end of the through hole located at a side facing the first main surface for mounting the diaphragm on the first main surface of the substrate.

A method of producing a semiconductor pressure sensor according to the present invention includes the following steps. A substrate having a first main surface and a second main surface opposite to each other is provided. On the first main surface of the substrate, an insulation film different from the substrate in etching property is provided. In the insulation film, an opening for exposing the first main surface of the substrate is formed in a manner surrounding circumferentially a predetermined region of the insulation film. A predetermined film to constitute a diaphragm is provided on the insulation film in a manner filling the opening. A predetermined etching mask is provided on a region of the second main surface of the substrate. The substrate is etched with the predetermined etching mask interposed to form a through hole in a manner exposing a surface of a portion of the insulation film located in the predetermined region. The diaphragm is formed by removing the portion of the insulation film located in the predetermined region to expose the predetermined film to constitute the diaphragm. The diaphragm is provided with a gauge resistor for sensing strain in the diaphragm as a variation in electric resistance.

In the semiconductor pressure sensor according to the present invention, predetermined films formed on the front surface of the substrate constitute the diaphragm. Accordingly, the diaphragm can be reduced in thickness with high accuracy only by changing the predetermined films in thickness.

By the method of producing a semiconductor pressure sensor according to the present invention, predetermined films formed on the front surface of the substrate constitute the diaphragm. Accordingly, the diaphragm can be reduced in thickness with high accuracy only by changing the predetermined films in thickness. Further, by forming an opening in the insulation film and forming the anchor portion in the opening, the region surrounded by the anchor portion is specified as a region to constitute the diaphragm. This ensures that the gauge resistor provided for the diaphragm can be located with accuracy. The region of diaphragm as well as the position of gauge resistor and the like can therefore be controlled by processing the first main surface of the substrate. Consequently, the diaphragm of reduced and less varied thickness can be formed with accuracy in the predetermined region, while size reduction of the semiconductor pressure sensor can be achieved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

A semiconductor pressure sensor having gauge resistors on the top face of a diaphragm made of a doped polysilicon film will now be described.

Figure 1:
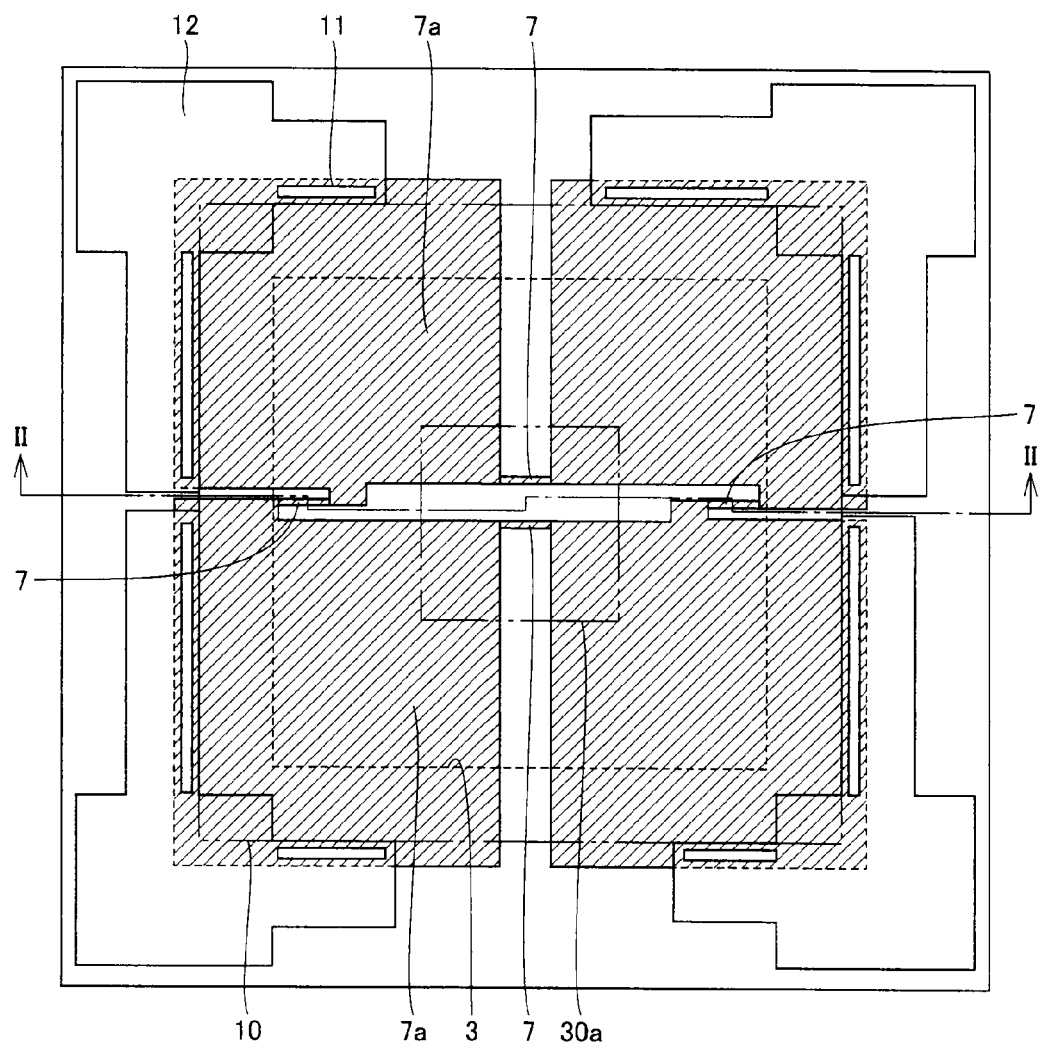
FIG. 1 is a plan view of a semiconductor pressure sensor according to a first embodiment of the present invention.
Figure 2:
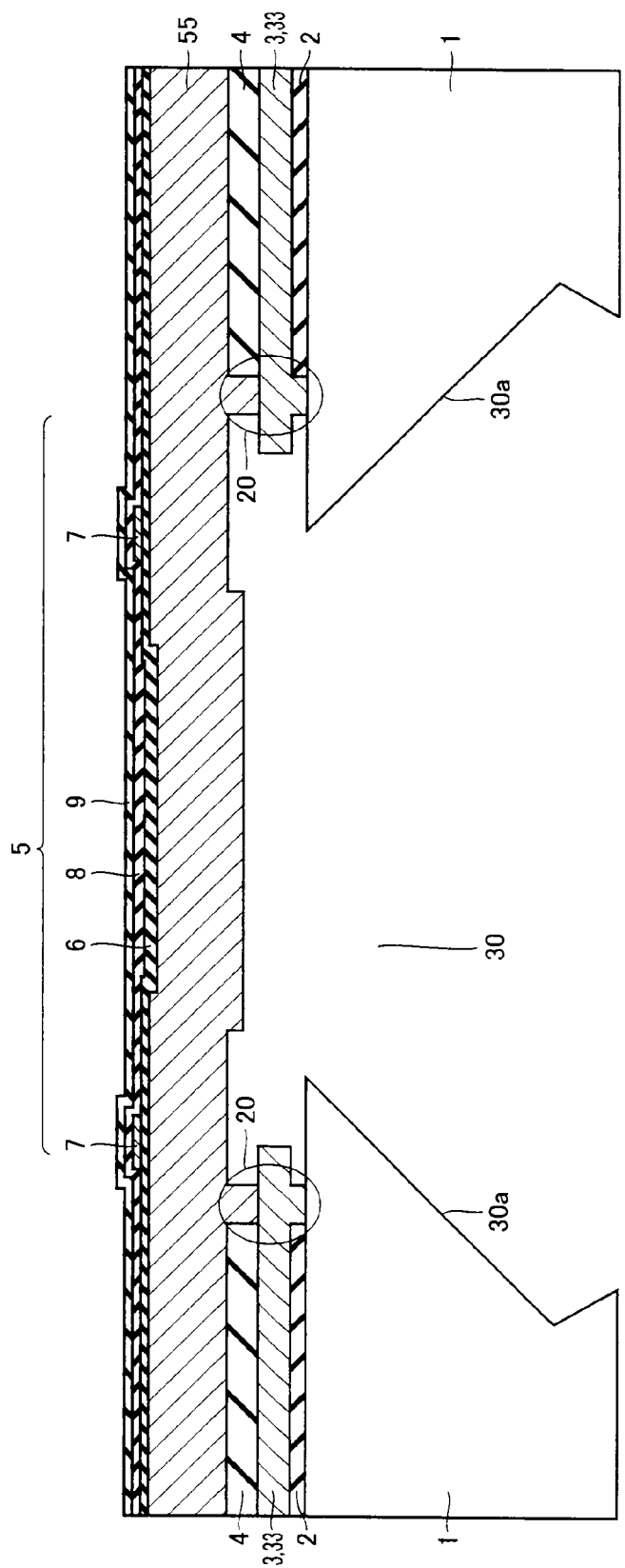
FIG. 2 is a sectional view taken along the sectional line II-II shown in FIG. 1 according to the first embodiment.

As shown in FIGS. 1 and 2, a silicon substrate 1 has formed above its first main surface a diaphragm 5 made of a doped polysilicon film 55. Diaphragm 5 has formed on its top face four gauge resistors 7 for sensing strain in diaphragm 5 as variations in electric resistance. A through hole 30 for exposing the bottom face of diaphragm 5 is formed in a portion of silicon substrate 1 above which diaphragm 5 is located. An anchor portion 20 for mounting diaphragm 5 on silicon substrate 1 is formed between diaphragm 5 and silicon substrate 1 in a manner surrounding circumferentially an opening end of through hole 30 located at the side facing the first main surface.

A first insulation film 2, a polysilicon sacrificial film 3 and a second insulation film 4 are stacked between diaphragm 5 and silicon substrate 1. Anchor portion 20 includes a portion of polysilicon sacrificial film 3 that fills an opening of first insulation film 2 and a portion of polysilicon film 55 that fills an opening of second insulation film 4 to project from diaphragm 5 toward silicon substrate 1.

Four gauge resistors 7, made of a polysilicon film, are formed on doped polysilicon film 55 to constitute diaphragm 5 with a third insulation film 6 interposed between four gauge resistors 7 and polysilicon film 55. Gauge resistors 7 are bridged by a polysilicon interconnection 7a made of the same polysilicon film as the polysilicon film constituting gauge resistors 7. A fourth insulation film 8 is formed in a manner covering gauge resistors 7 and polysilicon interconnection 7a.

A plurality of aluminum pads 12 are provided in predetermined regions on fourth insulation film 8. Each aluminum pad 12 is electrically connected to a corresponding portion of polysilicon interconnection 7a (a corresponding one of gauge resistors 7) through a contact portion 11. A fifth insulation film 9 is formed in a manner covering aluminum pads 12.

Figure 3:
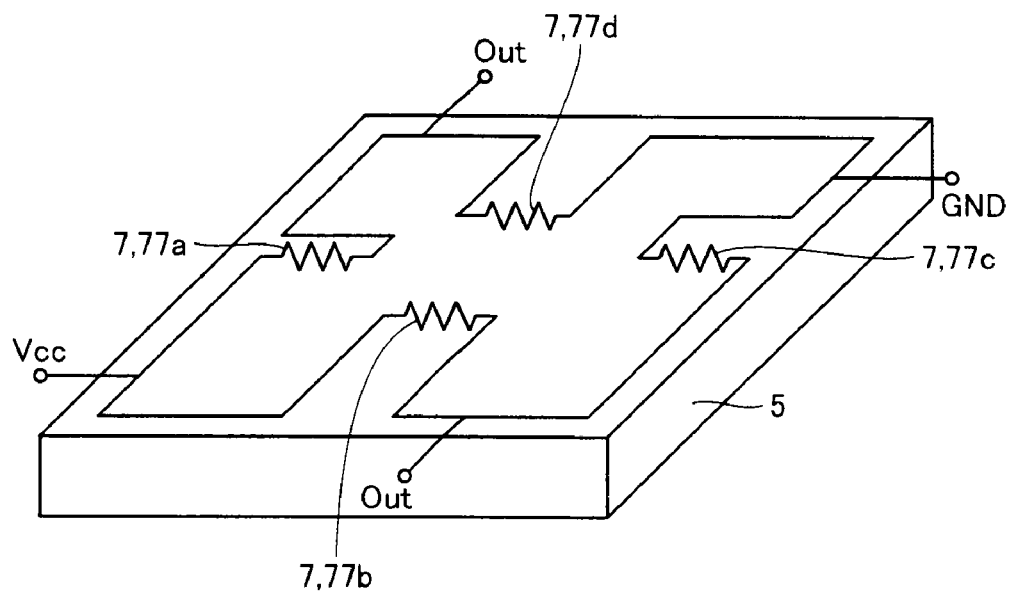
FIG. 3 is a perspective view showing a manner of connecting gauge resistors provided for a diaphragm according to the first embodiment.

Connection of gauge resistors 7 will now be described. As shown in FIG. 3, four gauge resistors 77a to 77d located on the top face of diaphragm 5 are bridged. The connection point between gauge resistors 77a and 77b serves as a Vcc terminal. The connection point between gauge resistors 77d and 77c serves as a GND terminal. The connection point between gauge resistors 77d and 77a and the connection point between gauge resistors 77b and 77c serve as OUT terminals. A predetermined voltage is applied between the Vcc terminal and GND terminal to sense a voltage between the OUT terminals, thereby sensing pressure.

Figure 4:
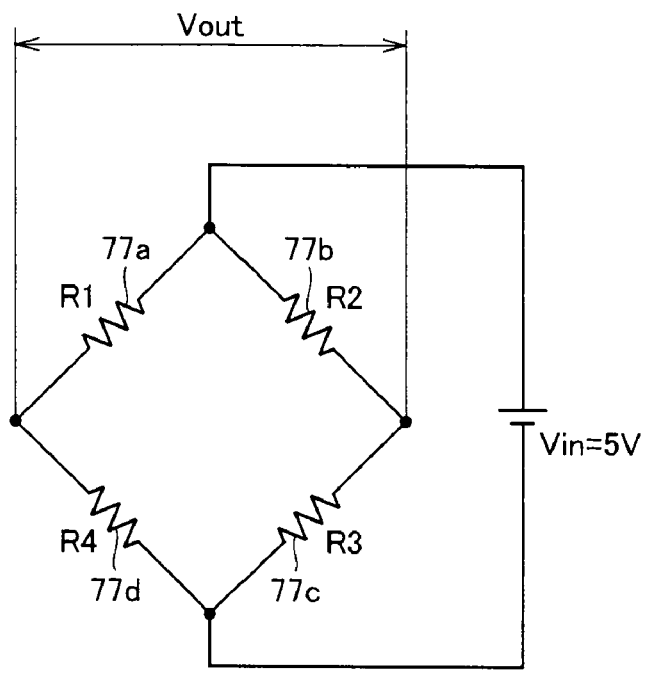
FIG. 4 is a circuit diagram for describing pressure measurement by the gauge resistors according to the first embodiment.

As shown in FIG. 4, assuming that gauge resistors 77a to 77d have resistances R1 to R4, respectively, and the voltage applied between the Vcc terminal and GND terminal is Vin, a voltage Vout between the OUT terminals are calculated by the following equation:

$$V\text{out}=(R2/(R2+R3)-R1/(R1+R4))\cdot V\text{in}$$

where the resistance in the initial state shall be $R1=R2=R3=R4=100\Omega$, and $V\text{in}=5V$. Assuming that the rate of change in resistance when 1 atm (00.098 MPa) pressure is applied to the semiconductor pressure sensor is $\Delta R1/R1=\Delta R3/R3=+1\%$ and $\Delta R2/R2=\Delta R4/R4=-1\%$, the voltage Vout between the OUT terminals is estimated at about 50 mV.

Figure 5:
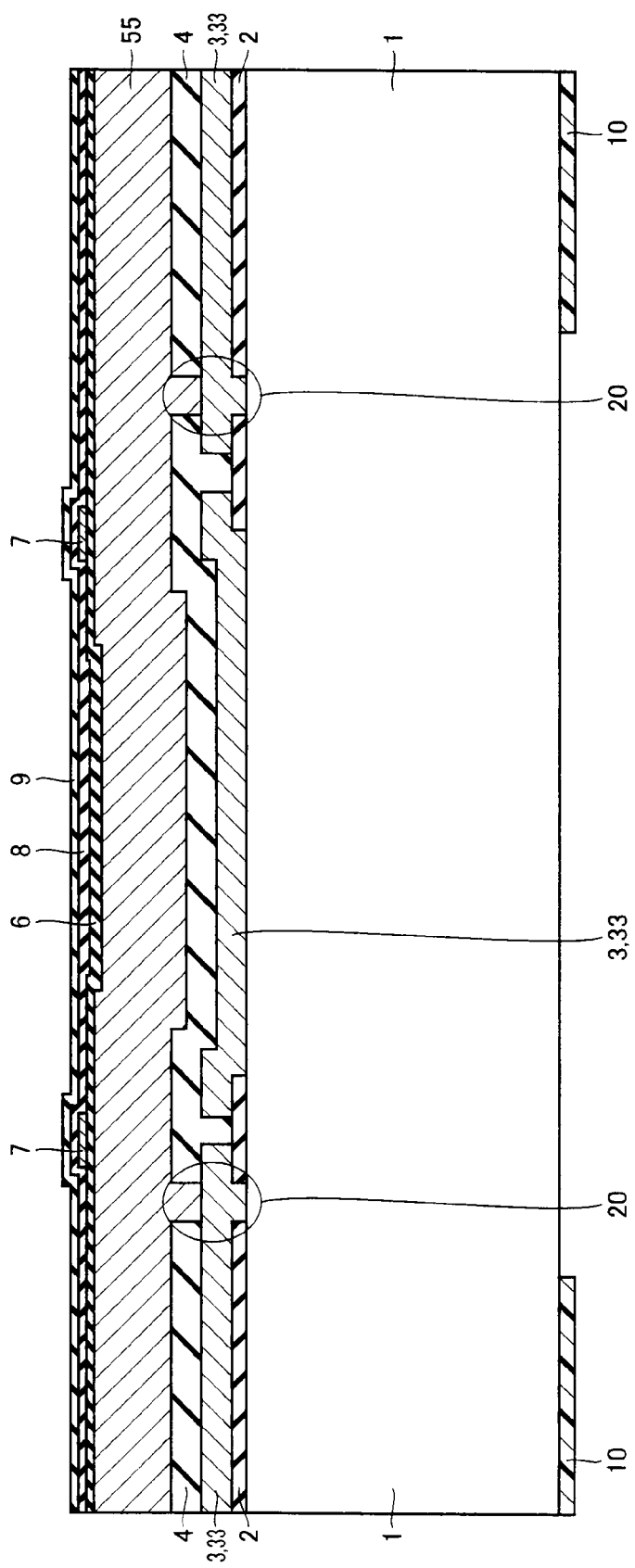
FIG. 5 is a sectional view of a step in a method of producing the semiconductor pressure sensor according to the first embodiment.

A method of producing the above-described semiconductor pressure sensor will now be described. First, a silicon substrate having a (110) crystal orientation is provided as the silicon substrate. As shown in FIG. 5, first insulation film 2 is formed on the front surface of silicon substrate 1 by thermal oxidation. A predetermined opening for exposing the front surface of silicon substrate 1 is formed in first insulation film 2 based on regions for the diaphragm and anchor portion.

Next, a doped polysilicon film 33 is formed on first insulation film 2 in a manner filling the opening, so that polysilicon sacrificial film 3 to constitute a sacrificial film when etching silicon substrate 1 is formed. A predetermined opening for exposing first insulation film 2 is formed in polysilicon sacrificial film 3 based on the region to constitute the anchor portion.

Next, second insulation film 4 such as a TEOS (Tetra Ethyl Ortho Silicate) film is formed in a manner covering polysilicon sacrificial film 3. A predetermined opening for exposing the top face of polysilicon sacrificial film 3 is formed in second insulation film 4 based on the region to constitute the anchor portion. Doped polysilicon film 55 having a thickness of about 0.4 to 8 μm to constitute the diaphragm is then formed on second insulation film 4 in a manner filling the opening.

At this stage, the doped polysilicon film is controlled in stress according to deposition conditions of the doped polysilicon film and annealing conditions after deposition of the doped polysilicon film. Accordingly, doped polysilicon film 55 is formed such that its top face is flat with no pressure being applied thereto.

Doped polysilicon film 55 to constitute the diaphragm thus fills the opening of second insulation film 4 to lead to doped polysilicon film 33 constituting polysilicon sacrificial film 3, and doped polysilicon film 33 further fills the opening of first insulation film 2 to lead to silicon substrate 1. Anchor portion 20 made of the doped polysilicon film for mounting diaphragm 5 on silicon substrate 1 is thus formed.

Next, third insulation film 6 such as an HTO (High Temperature Oxide) film is formed on doped polysilicon film 55 to constitute the diaphragm by CVD (Chemical Vapor Deposition), for example. Gauge resistors 7 and polysilicon interconnection 7a for connecting them are then formed on the top face of third insulation film 6 at predetermined positions in the region to constitute the diaphragm. Gauge resistors 7 are formed by doping a polysilicon (undoped) film with impurities such as boron (B). Polysilicon interconnection 7a (see FIG. 1) is made of the polysilicon film constituting gauge resistors 7. Gauge resistors 7 are bridged by polysilicon interconnection 7a.

Next, fourth insulation film 8 is formed in a manner covering gauge resistors 7. Openings (not shown) are then formed in fourth insulation film 8 to expose predetermined regions of polysilicon interconnection 7a. Aluminum pads 12 (see FIG. 1) are provided on the predetermined regions of fourth insulation film 8 in a manner filling the openings. Portions of aluminum pads 12 that fill the openings will constitute contact portions 11. Fifth insulation film 9 is then formed in a manner covering aluminum pads 12. Patterning of the first main surface of silicon substrate 1 is thereby completed.

Next, predetermined processing is applied to a second main surface of silicon substrate 1. First, the second main surface (back surface) of silicon substrate 1 is polished until silicon substrate 1 is reduced to a thickness of about 200 μm. An etching mask 10 is then provided on the back surface of silicon substrate 1 such that a predetermined region corresponding to the region to constitute the diaphragm is exposed.

Considering the amount of misalignment in photolithography and the amount of side etching in silicon etching, etching mask 10 shall be provided such that a region other than the region of polysilicon sacrificial film 3 located directly below the region to constitute the diaphragm will not be exposed when a substrate through hole is formed in a subsequent step.

Figure 6:
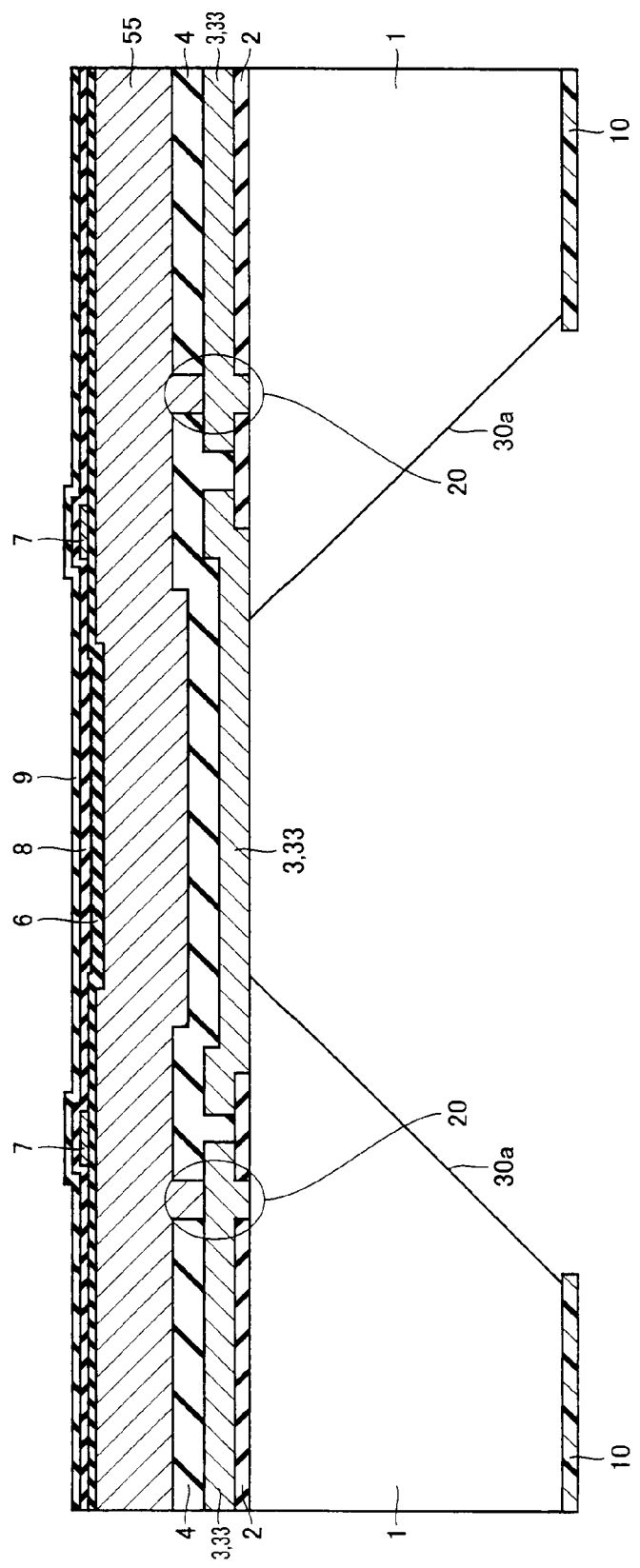
FIG. 6 is a sectional view of a step performed after the step shown in FIG. 5 according to the first embodiment.
Figure 7:
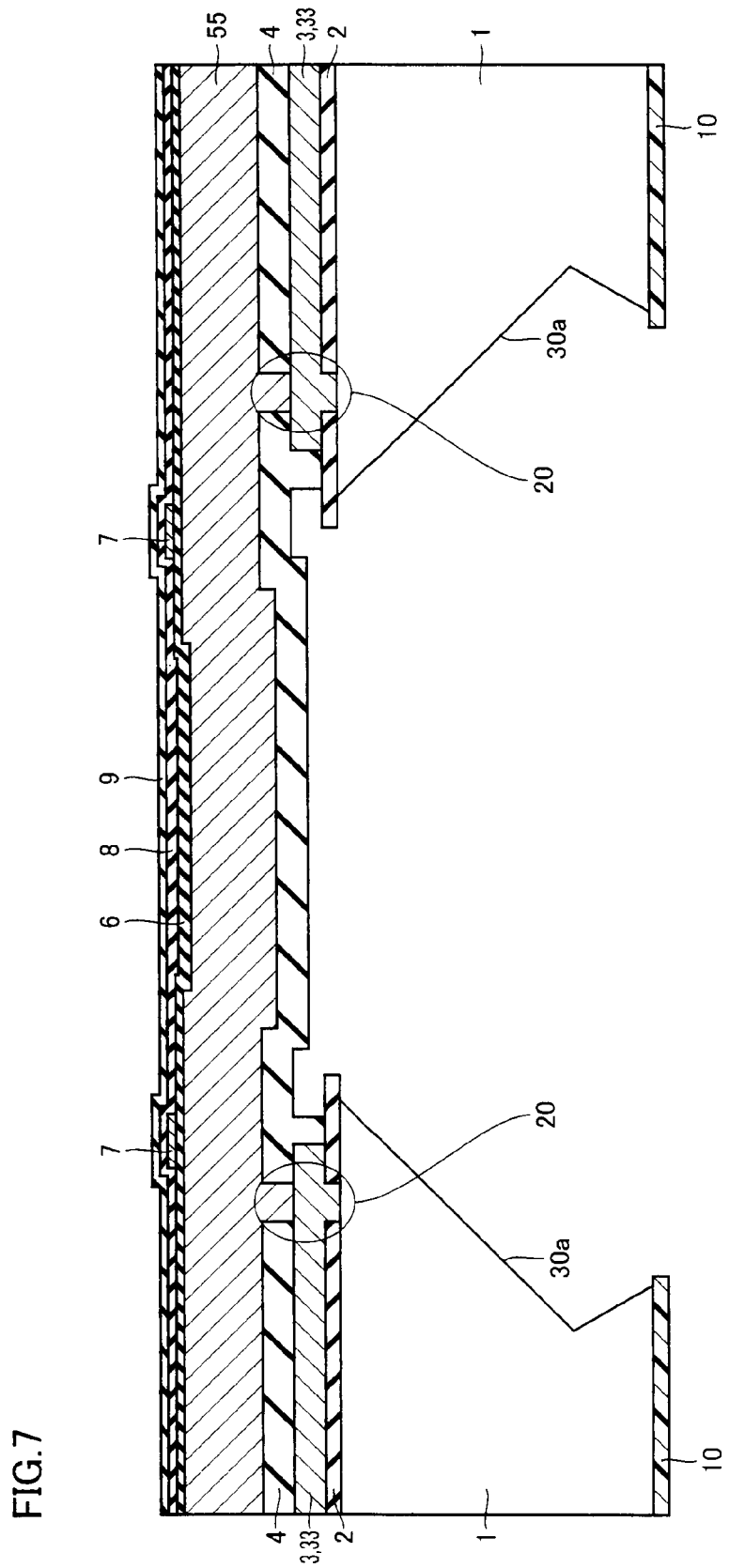
FIG. 7 is a sectional view of a step performed after the step shown in FIG. 6 according to the first embodiment.

Next, as shown in FIG. 6, the back surface of silicon substrate 1 is etched with an alkaline etching solution such as TMAH (Tetra Methyl Ammonium Hydroxide) with etching mask 10 interposed to form substrate through hole 30a extending through silicon substrate 1. As shown in FIG. 7, etching is continued further to completely remove the portion of doped polysilicon film 33 exposed by the formation of substrate through hole 30a. At this stage, second insulation film 4 serves as an etching stopper because of having an etching rate with the alkaline solution sufficiently lower than that of the polysilicon sacrificial film.

Figure 8:
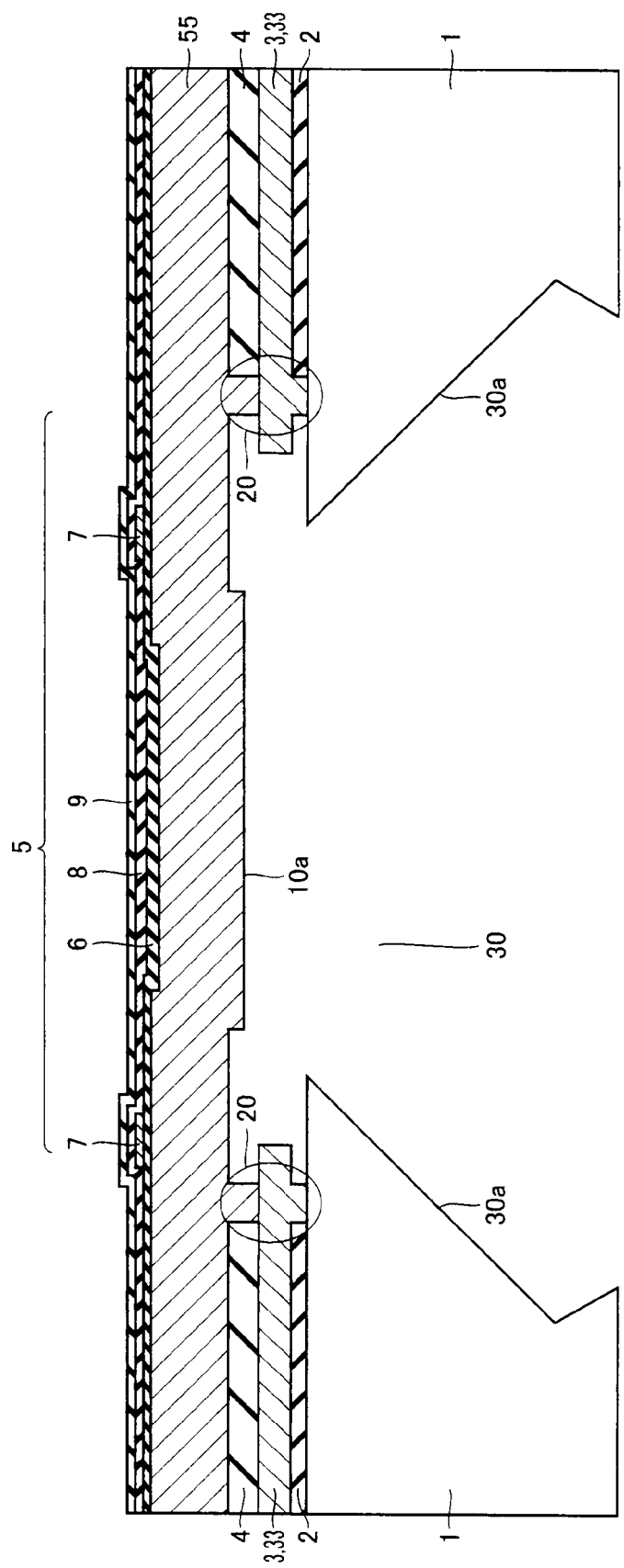
FIG. 8 is a sectional view of a step performed after the step shown in FIG. 7 according to the first embodiment.

Next, as shown in FIG. 8, the exposed portions of second insulation film 4 and first insulation film 2 are removed with an HF (hydrofluoric acid) solution, so that the bottom face of the portion of polysilicon film 55 to constitute diaphragm 5 is exposed as a diaphragm bottom face 10a. Thus formed are through hole 30 including substrate through hole 30a for exposing diaphragm bottom face 10a and diaphragm 5 made of polysilicon film 55.

In the above-described semiconductor pressure sensor, polysilicon film 55 formed above the front surface of silicon substrate 1 constitutes diaphragm 5. Accordingly, diaphragm 5 can be reduced in thickness with high accuracy merely by changing the polysilicon film in thickness. By forming the openings for anchor portion 20 in first insulation film 2 and second insulation film 4 and by providing anchor portion 20 in the openings, the region surrounded by anchor portion 20 will be specified as the region to constitute diaphragm 5.

Further, the polysilicon film formed on the region to constitute diaphragm 5 is subjected to photolithography to form gauge resistors 7 and polysilicon interconnection 7a. Accordingly, the region to constitute diaphragm 5 as well as the position of gauge resistors 7 and the like can be controlled by the processing performed on the first main surface of silicon substrate 1. Consequently, diaphragm 5 of reduced and uniform thickness, gauge resistors 7 and the like can be formed in predetermined regions with high accuracy, while the semiconductor pressure sensor can be reduced in size. The semiconductor pressure sensor can therefore be improved in pressure sensing accuracy.

Second Embodiment

A semiconductor pressure sensor having gauge resistors on each of the top and bottom faces of a diaphragm made of a doped polysilicon film will now be described.

Figure 9:
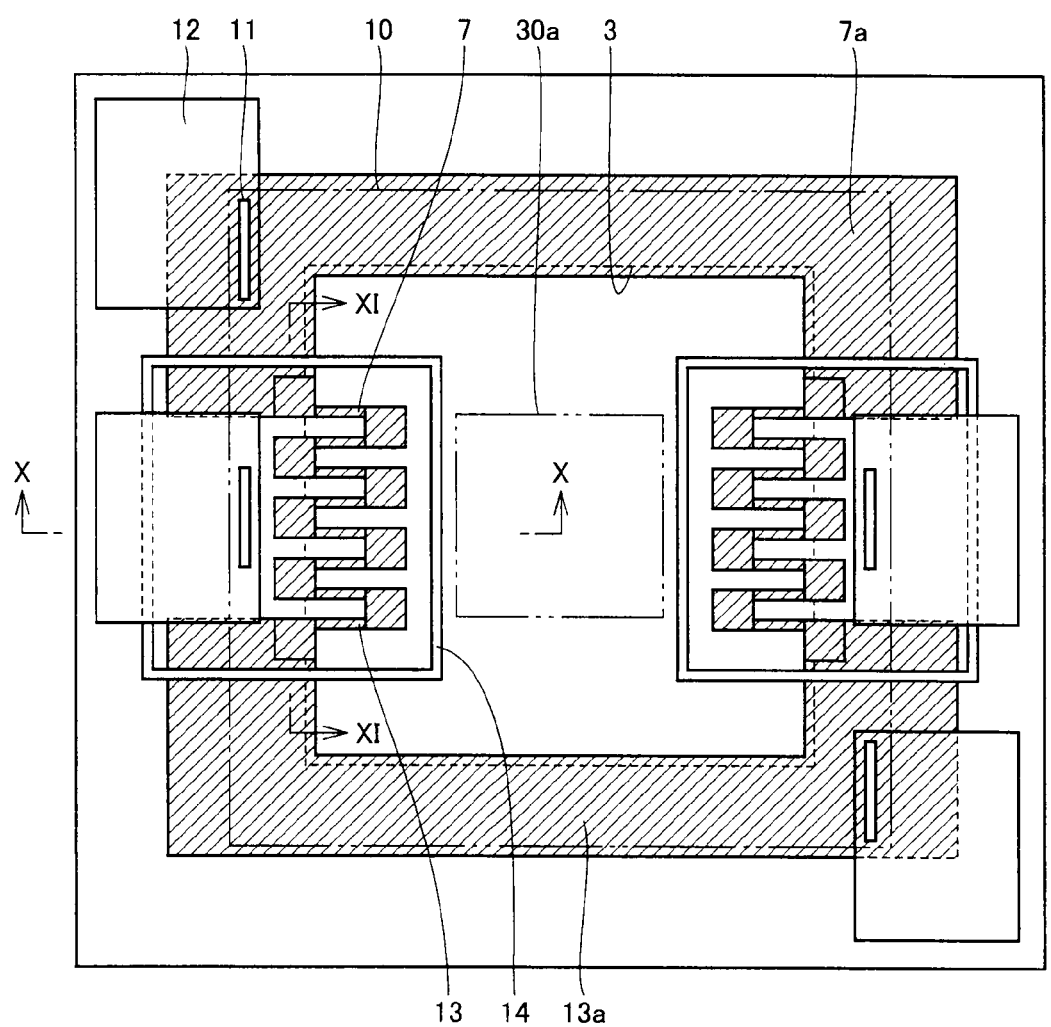
FIG. 9 is a plan view of a semiconductor pressure sensor according to a second embodiment of the present invention.
Figure 10:
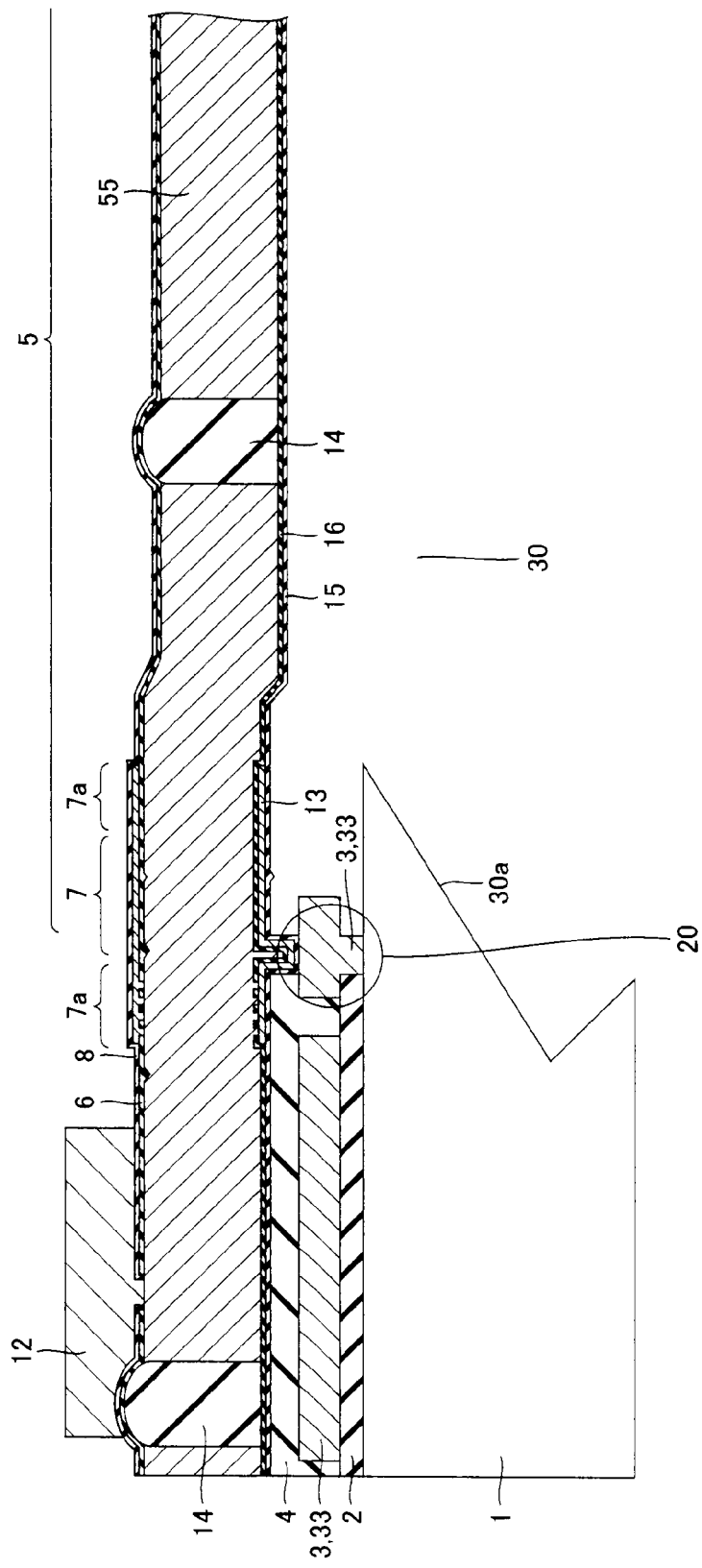
FIG. 10 is a sectional view taken along the sectional line X-X shown in FIG. 9 according to the second embodiment.
Figure 11:
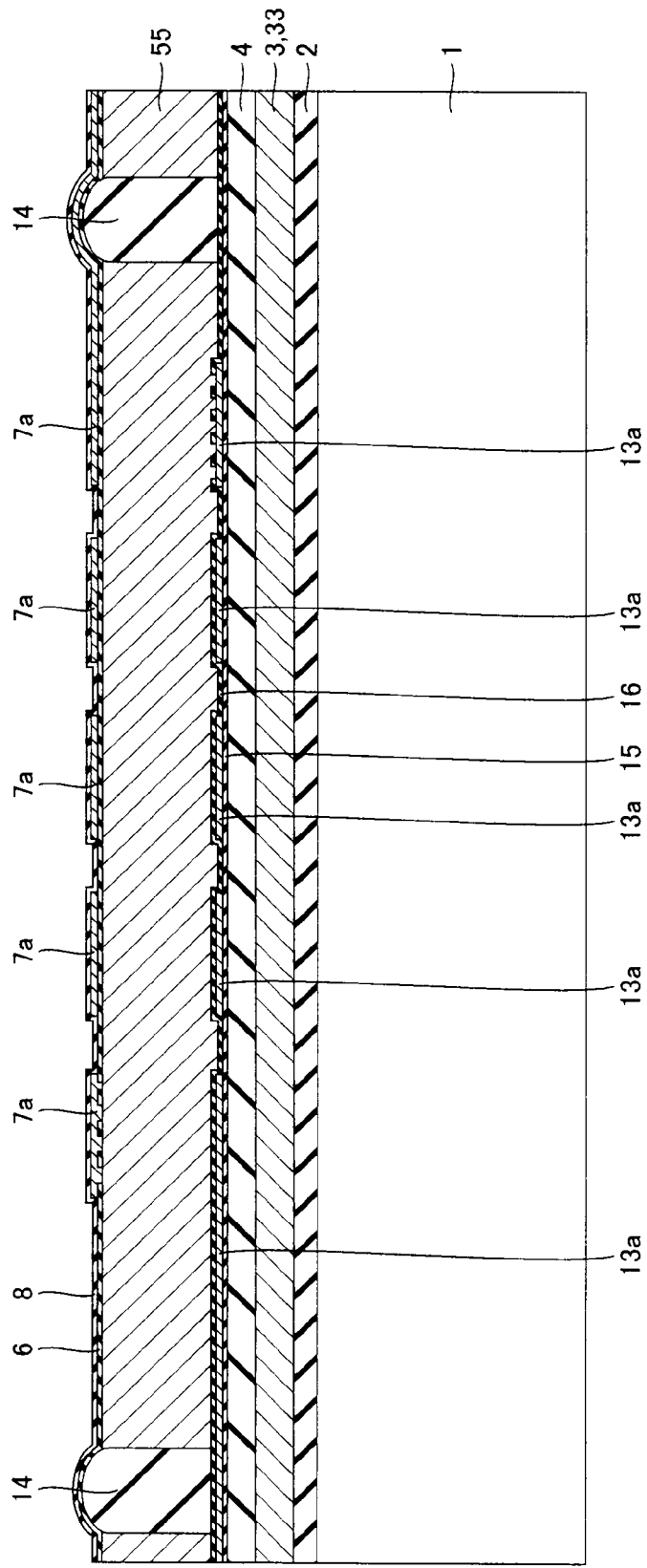
FIG. 11 is a sectional view taken along the sectional line XI-XI shown in FIG. 9 according to the second embodiment.

As shown in FIGS. 9, 10 and 11, silicon substrate 1 has formed above its first main surface diaphragm 5 made of polysilicon film 55. Diaphragm 5 has two gauge resistors 7 provided on its top face and two gauge resistors 13 provided on its bottom face below gauge resistors 7. The region where gauge resistors 7 and 13 are located is surrounded by an isolation oxide film 14 extending through polysilicon film 55 to constitute diaphragm 5.

Figure 12:
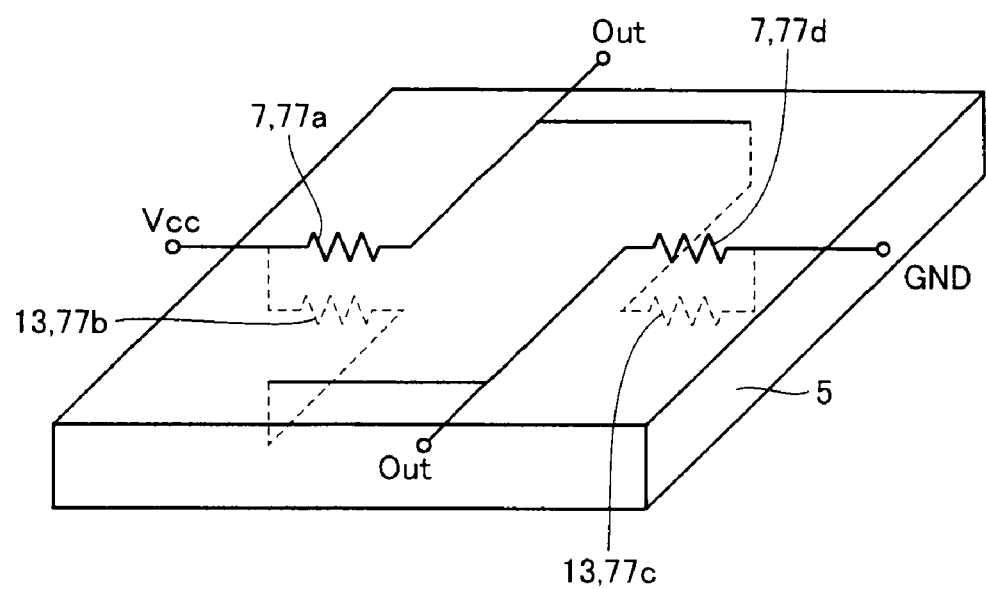
FIG. 12 is a perspective view showing a manner of connecting gauge resistors provided for a diaphragm according to the second embodiment.

As shown in FIG. 12, two gauge resistors 77a and 77d located on the top face of diaphragm 5 and two gauge resistors 77b and 77c located on the bottom face are bridged. More specifically, gauge resistors 77a and 77b are connected electrically through the portion of doped polysilicon film 55 surrounded by isolation oxide film 14. Similarly, gauge resistors 77d and 77c are connected electrically through the portion of doped polysilicon film 55 surrounded by isolation oxide film 14.

The connection point between gauge resistors 77a and 77b serves as a Vcc terminal. The connection point between gauge resistors 77d and 77c serves as a GND terminal. The connection point between gauge resistors 77d and 77a and the connection point between gauge resistors 77b and 77c serve as OUT terminals. As described above, a predetermined voltage is applied between the Vcc terminal and GND terminal to sense the voltage between the OUT terminals, thereby sensing pressure.

Particularly, according to these gauge resistors, doped polysilicon film 55 to constitute diaphragm 5 is interposed between gauge resistors 77a and 77b, and between gauge resistors 77d and 77c. Accordingly, when a compressive (or tensile) stress is applied to gauge resistors 77a and 77d, a tensile (or compressive) stress will be applied to gauge resistors 77b and 77c. In other words, the amount of change in resistance acts positively with respect to an initial resistance on gauge resistors 77a and 77d or 77b and 77c, and acts negatively on gauge resistors 77b and 77c or 77a and 77d. An output voltage in accordance with pressure will be generated at the output terminal.

Since the remaining structure is similar to that of the semiconductor pressure sensor shown in FIG. 1 and the like, like components are denoted by like reference characters, and description thereof will not be repeated.

Figure 13:
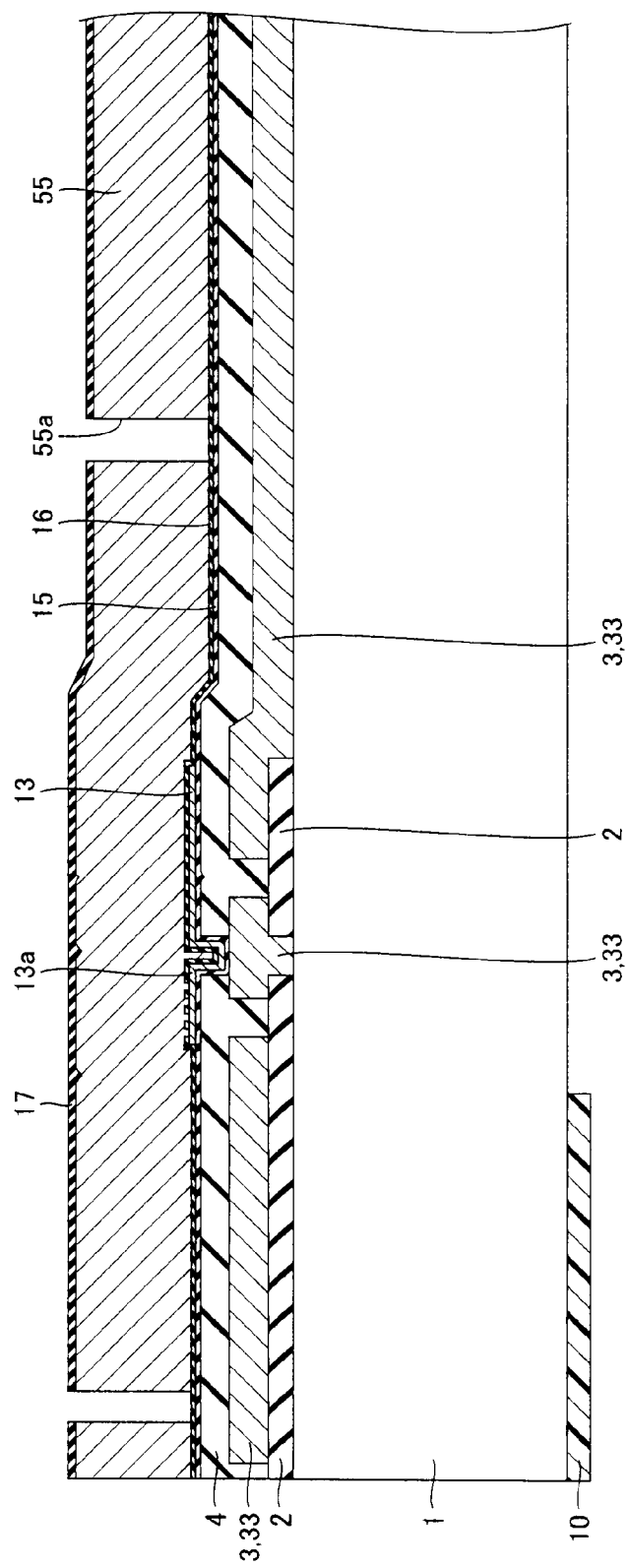
FIG. 13 is a sectional view of a step in a method of producing the semiconductor pressure sensor according to the second embodiment.

A method of producing the above-described semiconductor pressure sensor will now be described. First, steps similar to the above-described producing steps are performed to form first insulation film 2, polysilicon sacrificial film 3 and second insulation film 4 on the first main surface of silicon substrate 1, as shown in FIG. 13. A sixth insulation film 15 made of a silicon nitride film is then formed on second insulation film 4. Sixth insulation film 15 serves as an etching stopper when removing second insulation film 4.

Next, gauge resistors 13 and polysilicon interconnection 13a made of a polysilicon film are formed on predetermined regions at the top face of sixth insulation film 15. A seventh insulation film 16 is formed in a manner covering gauge resistors 13 and polysilicon interconnection 13a. Openings for exposing polysilicon interconnection 13a are then formed in predetermined regions of seventh insulation film 16. Doped polysilicon film 55 to constitute diaphragm 5 is then formed on seventh insulation film 16 in a manner filling the openings.

At this stage, as described above, the film stress is controlled according to deposition conditions and annealing conditions. Accordingly, doped polysilicon film 55 is formed such that its top face is flat with no pressure being applied thereto.

Doped polysilicon film 55 to constitute the diaphragm thus fills the openings of second insulation film 4 to lead to doped polysilicon film 33 constituting polysilicon sacrificial film 3, and doped polysilicon film 33 further fills the opening of first insulation film 2 to lead to silicon substrate 1. Anchor portion 20 made of the doped polysilicon film for mounting diaphragm 5 on silicon substrate 1 is thus formed.

Figure 14:
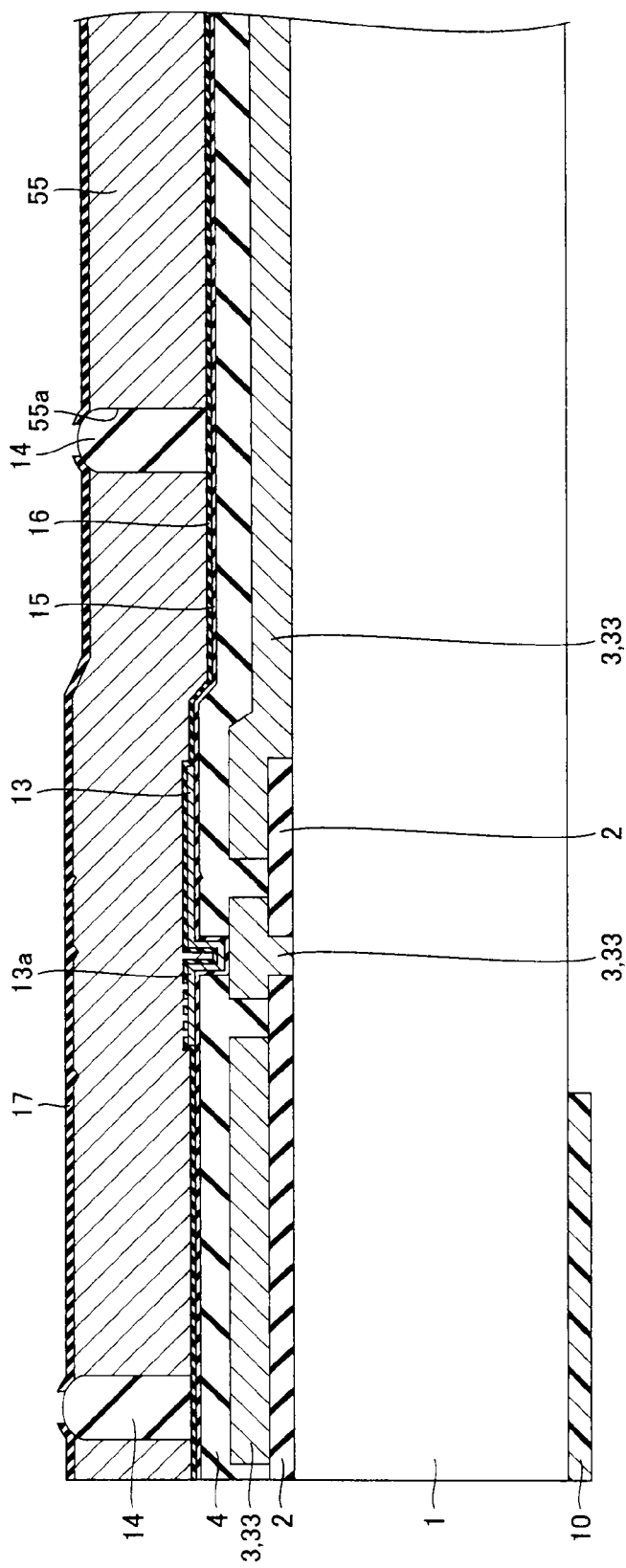
FIG. 14 is a sectional view of a step performed after the step shown in FIG. 13 according to the second embodiment.

Next, a silicon nitride film 17 is provided in a manner covering doped polysilicon film 55. An opening 55a is then formed in silicon nitride film 17 and doped polysilicon film 55 in a manner surrounding the predetermined region where gauge resistors 7 and 13 are located. Isolation oxide film 14 is then formed in opening 55a, as shown in FIG. 14. An opening may be formed in doped polysilicon film 55 without providing a silicon nitride film, and may be filled with a TEOS film or the like. The portion of doped polysilicon film 55 surrounded by isolation oxide film 14 will function as an interconnection. Silicon nitride film 17 is thereafter removed.

Figure 15:
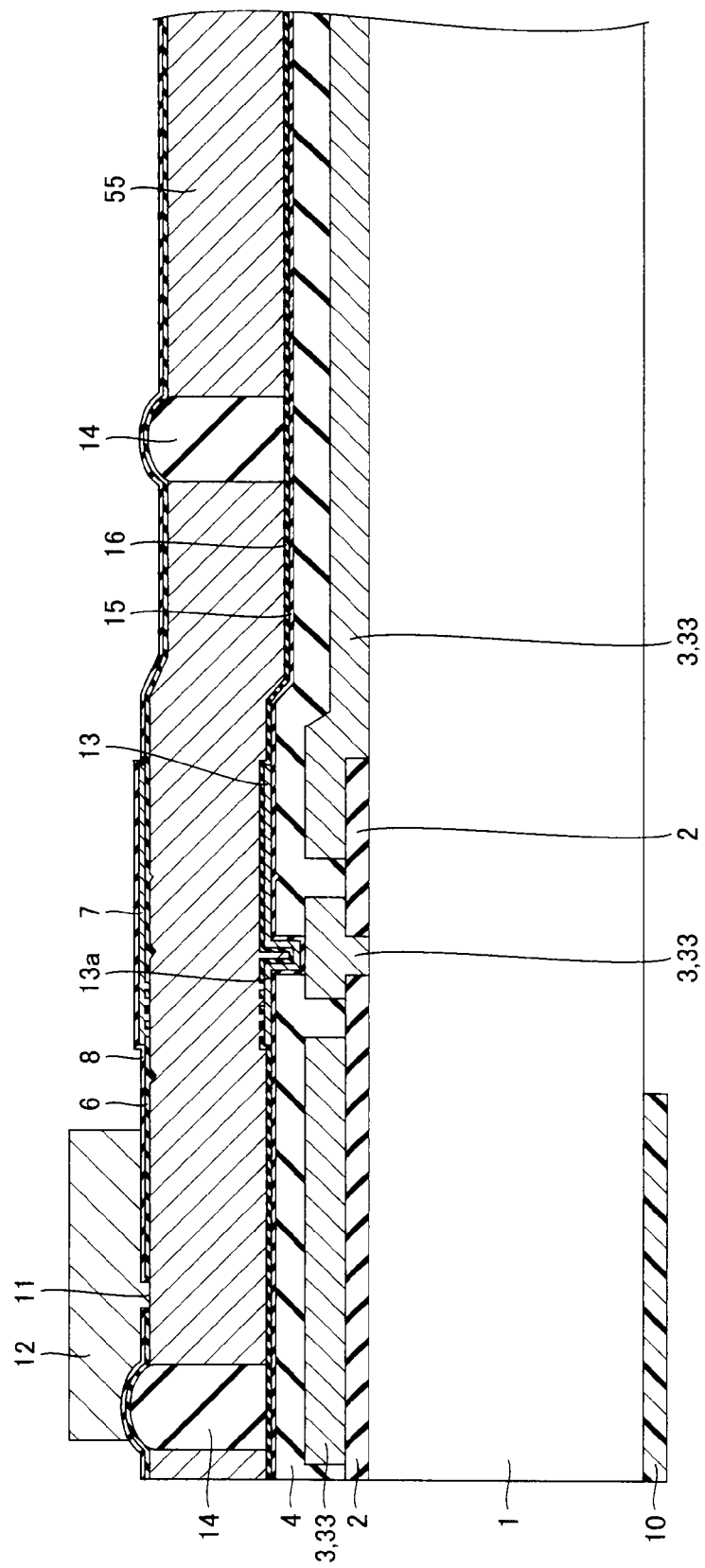
FIG. 15 is a sectional view of a step performed after the step shown in FIG. 14 according to the second embodiment.

Next, as shown in FIG. 15, third insulation film 6 such as an HTO film is formed on doped polysilicon film 55 by CVD. An opening for exposing the top face of doped polysilicon film 55 is formed in third insulation film 6. Gauge resistor 7 made of a polysilicon film is then formed in a manner filling the opening. Gauge resistors 7 and 13 will be electrically connected to each other through the portion of doped polysilicon film 55 surrounded by isolation oxide film 14.

Next, fourth insulation film 8 is formed in a manner covering gauge resistor 7. An opening for exposing a portion of doped polysilicon film 55 is then formed in fourth insulation film 8. Aluminum pad 12 is provided on a predetermined region of fourth insulation film 8 in a manner filling the opening. A portion of aluminum pad 12 filling the opening will constitute contact portion 11.

Next, the second main surface (back surface) of silicon substrate 1 is polished until silicon substrate 1 is reduced to a thickness of about 200 μm. An etching mask 10 is then provided on the back surface of silicon substrate 1 such that a predetermined region corresponding to the region to constitute the diaphragm is exposed. As described above, considering the amount of misalignment in photolithography and the amount of side etching in silicon etching, etching mask 10 shall be provided such that a region other than the region of polysilicon sacrificial film 3 (doped polysilicon film 33) located directly below the region to constitute the diaphragm will not be exposed when a substrate through hole is formed in a subsequent step.

Figure 16:
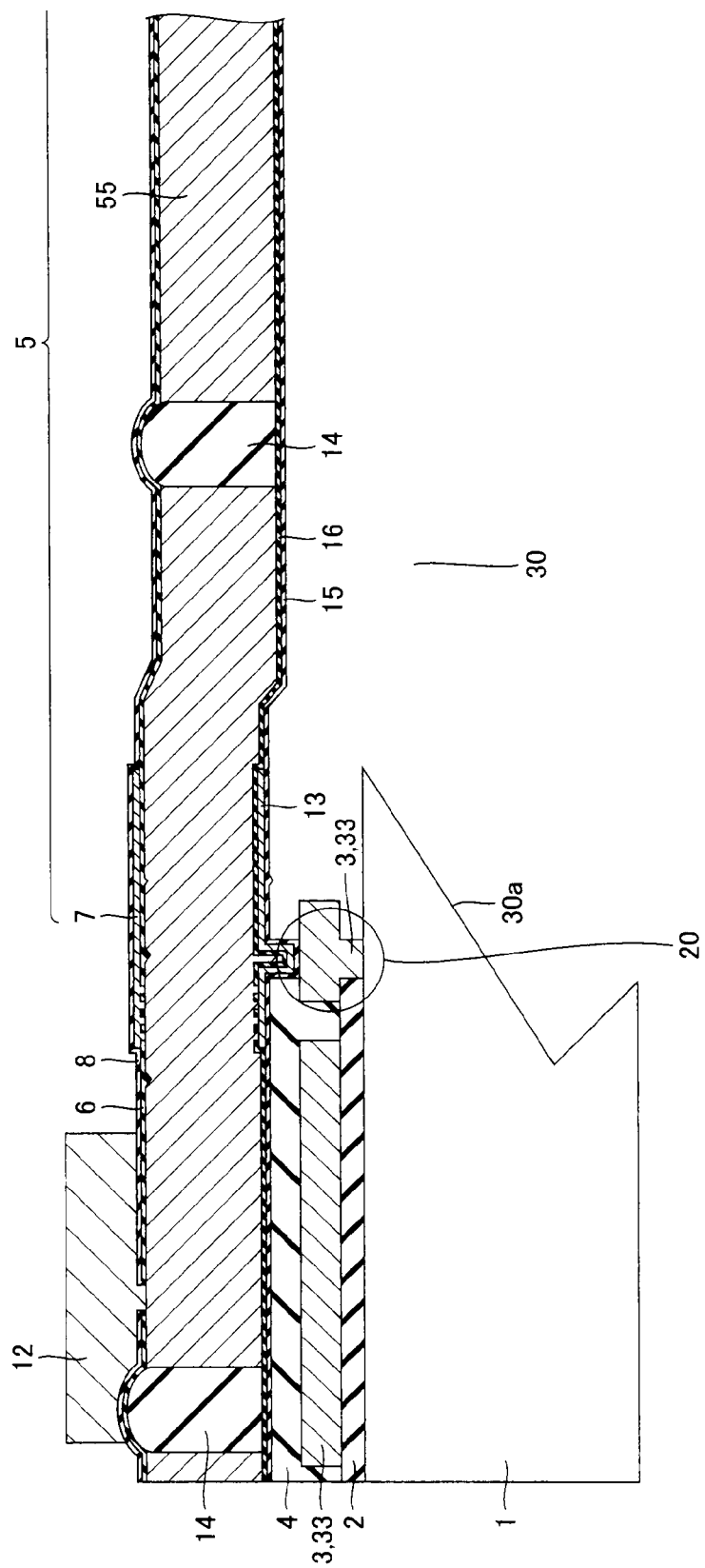
FIG. 16 is a sectional view of a step performed after the step shown in FIG. 15 according to the second embodiment.

Next, as shown in FIG. 16, the back surface of silicon substrate 1 is etched with an alkaline etching solution such as TMAH with etching mask 10 interposed to form substrate through hole 30a extending through silicon substrate 1. Etching is continued further to completely remove the portion of doped polysilicon film 33 exposed by the formation of substrate through hole 30a. At this stage, sixth insulation film 15 serves as an etching stopper because of having an etching rate with the alkaline etching solution sufficiently lower than that of the polysilicon sacrificial film.

Next, the exposed portions of sixth insulation film 15 and first insulation film 2 are removed with an HF (hydrofluoric acid) solution, so that the bottom face of the portion of polysilicon film 55 to constitute diaphragm 5 is exposed as diaphragm bottom face 10a. Thus formed are through hole 30 including substrate through hole 30a for exposing diaphragm bottom face 10a and diaphragm 5 made of polysilicon film 55.

In addition to the effects that the above-described diaphragm of reduced and uniform thickness can be formed with accuracy in the predetermined region and that the region of diaphragm 5 as well as the position of gauge resistor 7 and the like can be controlled by processing the first main surface of silicon substrate 1, the above-described semiconductor pressure sensor has the following effect. Specifically, providing the gauge resistors on each of the top and bottom faces of diaphragm 5 can achieve further size reduction of the semiconductor pressure sensor.

Third Embodiment

Figure 17:
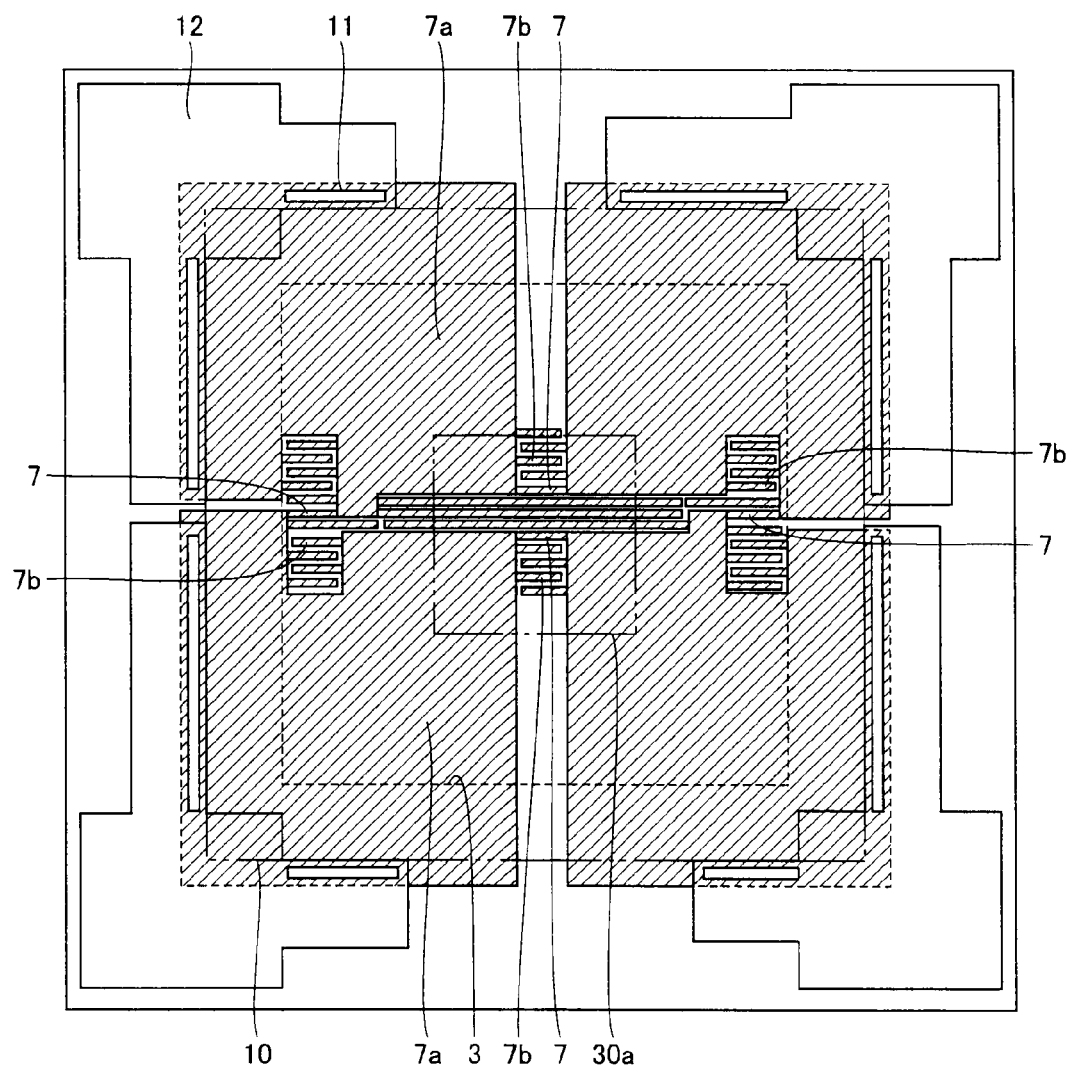
FIG. 17 is a plan view of a semiconductor pressure sensor according to a third embodiment of the present invention.

A semiconductor pressure sensor having a dummy polysilicon pattern will now be described. As shown in FIG. 17, in the present semiconductor pressure sensor, a dummy polysilicon pattern 7b having a width corresponding to that of gauge resistors 7 is provided along with the pattern of gauge resistors 7. Dummy polysilicon pattern 7b and gauge resistors 7 have a width of about 0.6 to 1.0 μm. Polysilicon interconnection 7a has a width of about 2 to 200 μm. The remaining structure is similar to that of the semiconductor pressure sensor shown in FIG. 1 and the like, like components are denoted by like reference characters, and description thereof will not be repeated.

To increase the piezoresistance coefficient of gauge resistors made of a polysilicon film, it is desirable to reduce the area in cross section. Reducing the gauge resistors in width will cause a resist (pattern) to be likely to vary in width in photolithography. This may cause variations in the final width of the gauge resistors after etching, which affects the pressure sensing accuracy.

Figure 18:
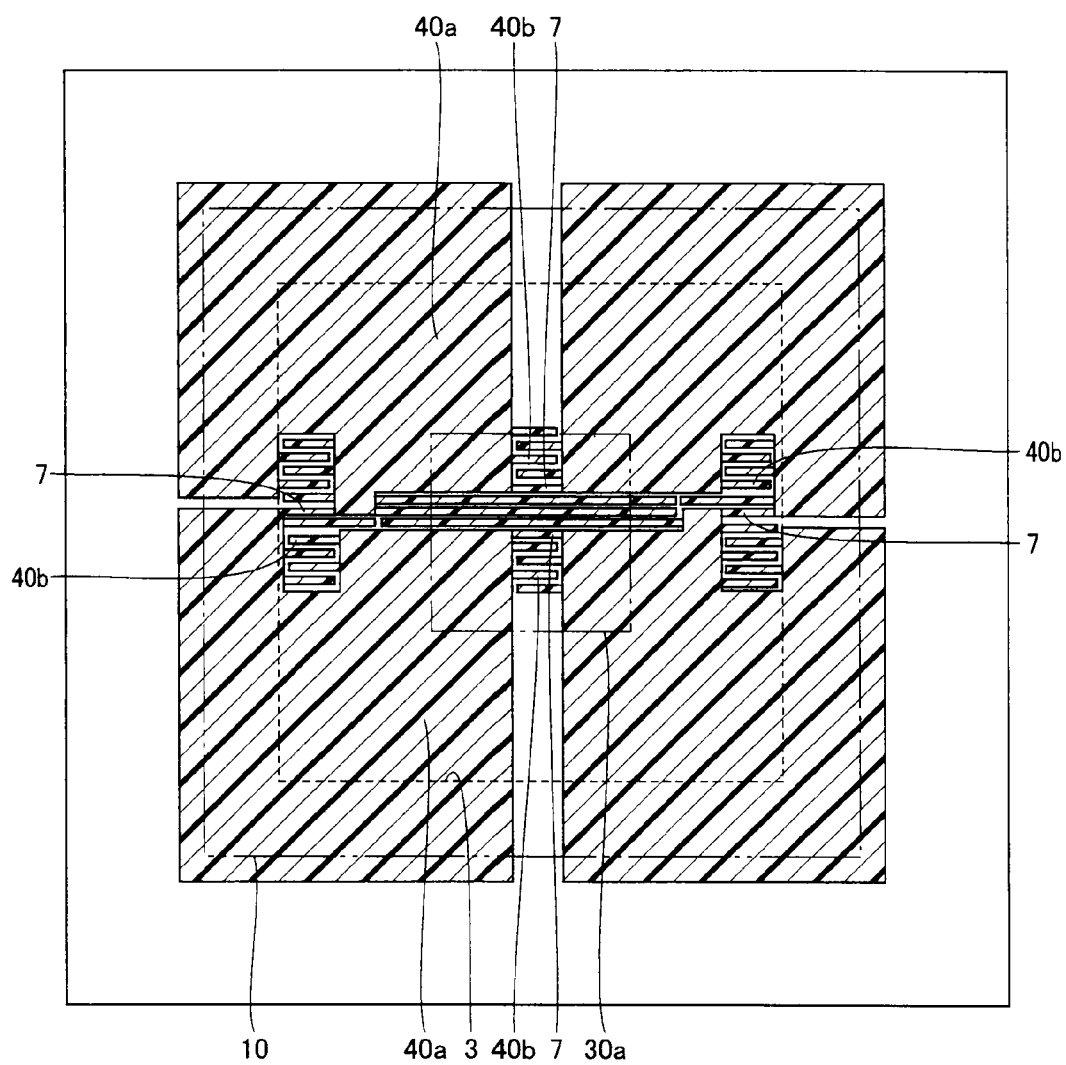
FIG. 18 is a sectional view of a step in a method of producing the semiconductor pressure sensor according to the third embodiment.

Accordingly, as shown in FIG. 18, in the present semiconductor pressure sensor, a dummy resist pattern 40b having a width equal to that of a resist pattern 40a for patterning the gauge resistors is provided to constitute a line-and-space pattern with resist pattern 40a. Then, resist pattern 40a for patterning the gauge resistors is less likely to vary in width than in the case of forming a pattern only including gauge resistors of narrow width. This result in reduced variations in final width of gauge resistors 7 after etching.

Fourth Embodiment

Figure 19:
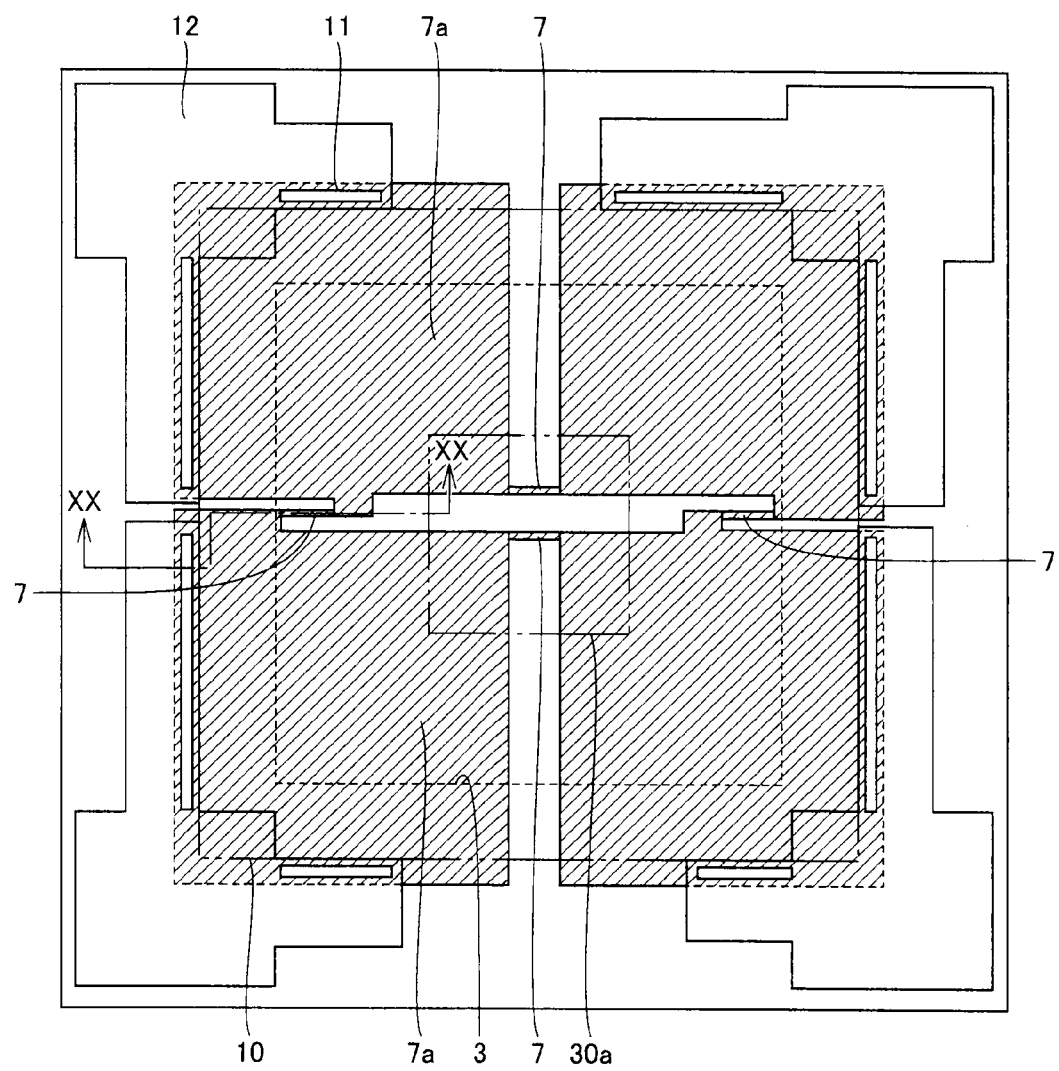
FIG. 19 is a plan view of a semiconductor pressure sensor according to a fourth embodiment of the present invention.
Figure 20:
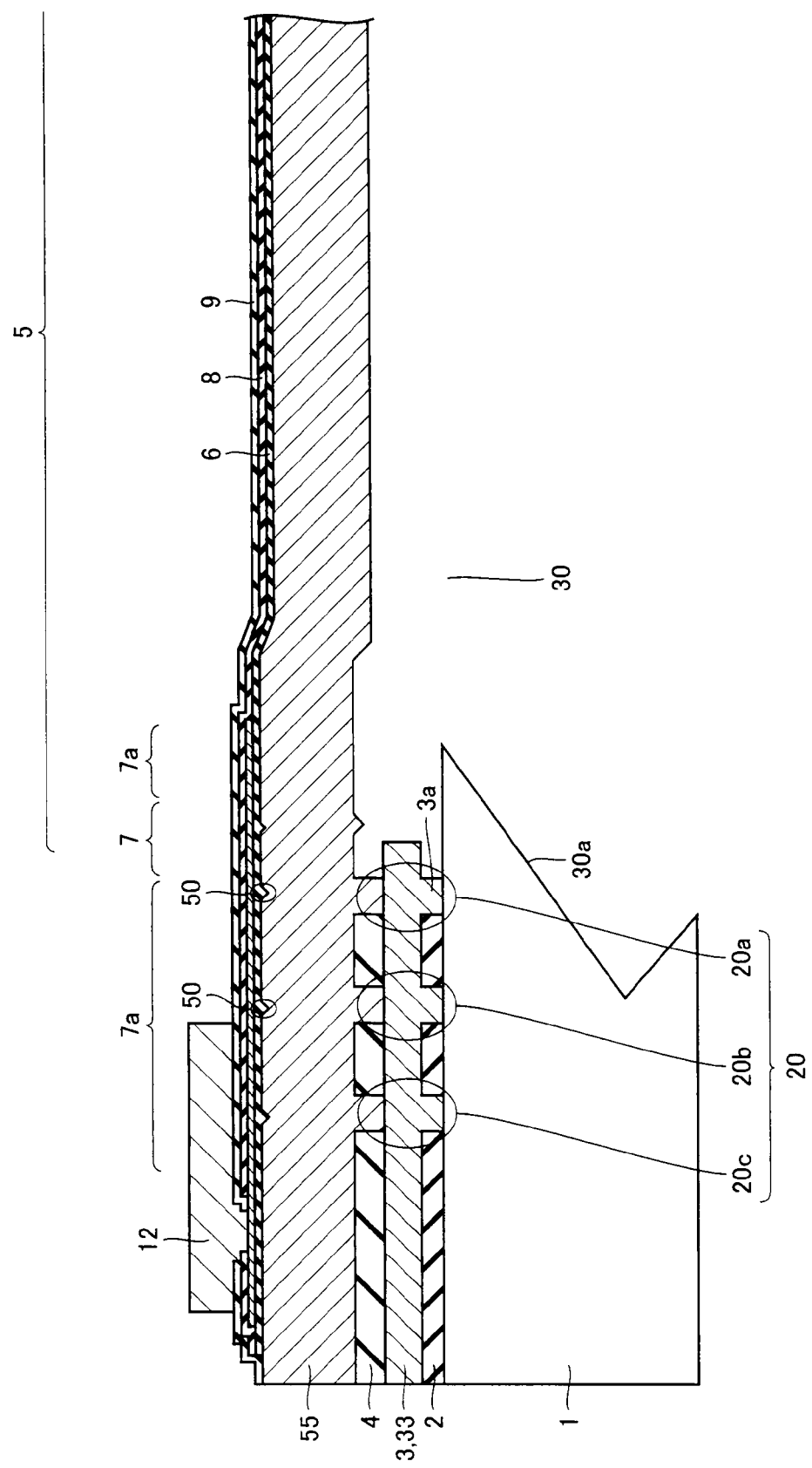
FIG. 20 is a sectional view taken along the sectional line XX-XX shown in FIG. 19 according to the second embodiment.

A semiconductor pressure sensor having a plurality of anchor portions will now be described. As shown in FIGS. 19 and 20, the present semiconductor pressure sensor has a plurality of anchor portions 20a, 20b and 20c as anchor portion 20 for mounting diaphragm 5 made of doped polysilicon film 55 on silicon substrate 1. The remaining structure is similar to that of the semiconductor pressure sensor shown in FIG. 1 and the like, like components are denoted by like reference characters, and description thereof will not be repeated.

As described in the first embodiment, anchor portion 20 is made of the portion of doped polysilicon film 55 and the like that fill the openings formed in first insulation film 2 and second insulation film 4. This may cause steps (recesses) to occur in the top face of the portion of doped polysilicon film 55 that fill the openings, as indicated by circles 50.

To avoid such steps, the openings need to be narrowed in opening width as much as possible. However, narrowing the openings in opening width reduces the contact area between the anchor portions and the silicon substrate, which may degrade the function of the anchor portions.

Therefore, the present semiconductor pressure sensor has a plurality of openings of a narrower opening width, and doped polysilicon film 55 and the like fill the plurality of openings to form a plurality of anchor portions 20. Accordingly, generation of steps (recesses) at the top face of doped polysilicon film 55 located above anchor portions 20a, 20b and 20c can be prevented, while maintaining the contact area between anchor portions 20a, 20b, 20c and silicon substrate 1. Preventing the generation of steps can improve the accuracy in photolithography performed on doped polysilicon film 55.

As to anchor portions 20, a substantial region (area) for diaphragm 5 is determined by the region surrounded by anchor portion 20a located at the innermost position among the plurality of anchor portions 20a, 20b and 20c. In addition, since diaphragm 5 is mounted on silicon substrate 1 by anchor portion 20, anchor portion 20 also functions as a stopper for anchoring the diaphragm freed from stress to the silicon substrate.

Fifth Embodiment

Figure 21:
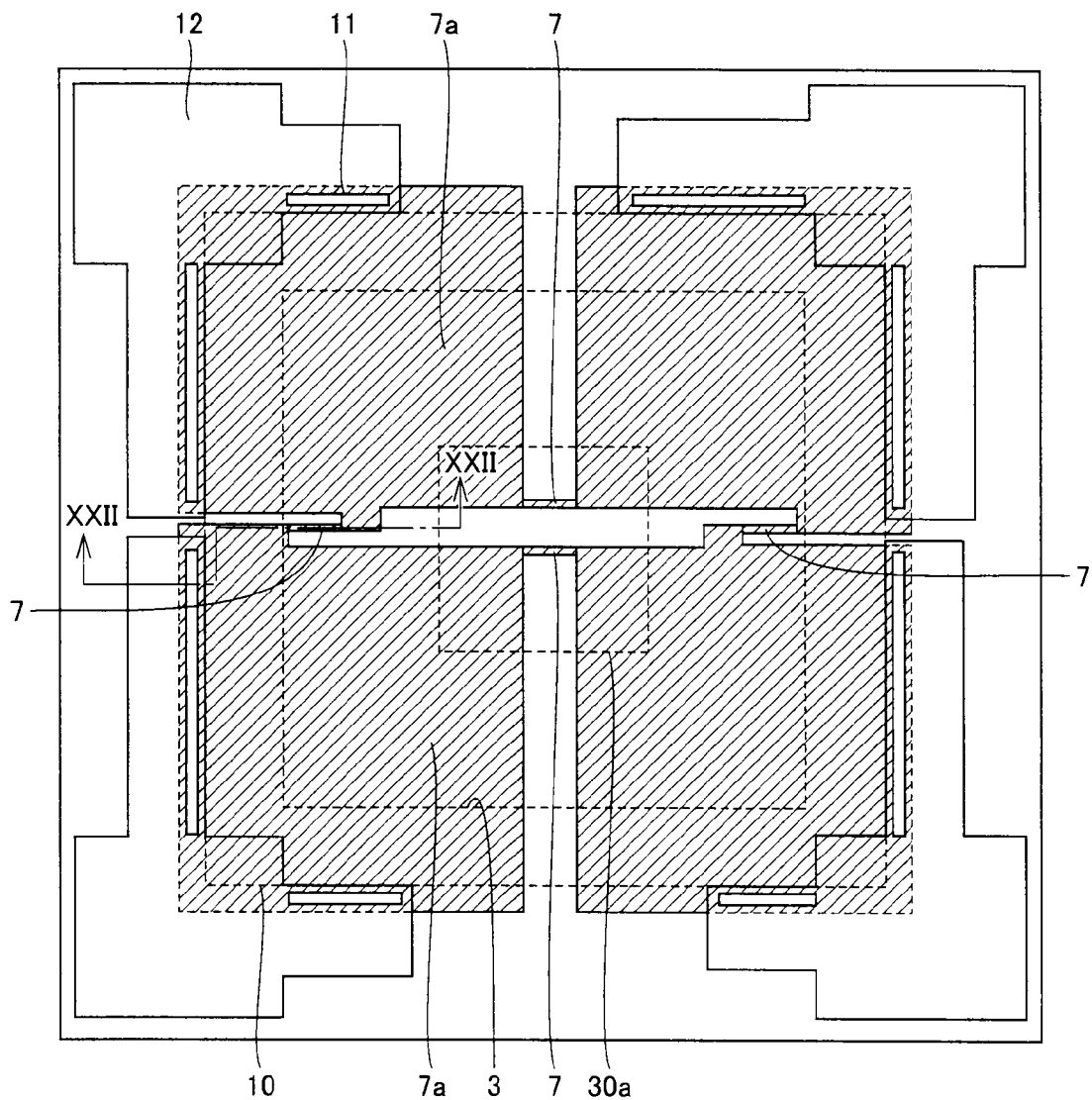
FIG. 21 is a plan view of a semiconductor pressure sensor according to a fifth embodiment of the present invention.
Figure 22:
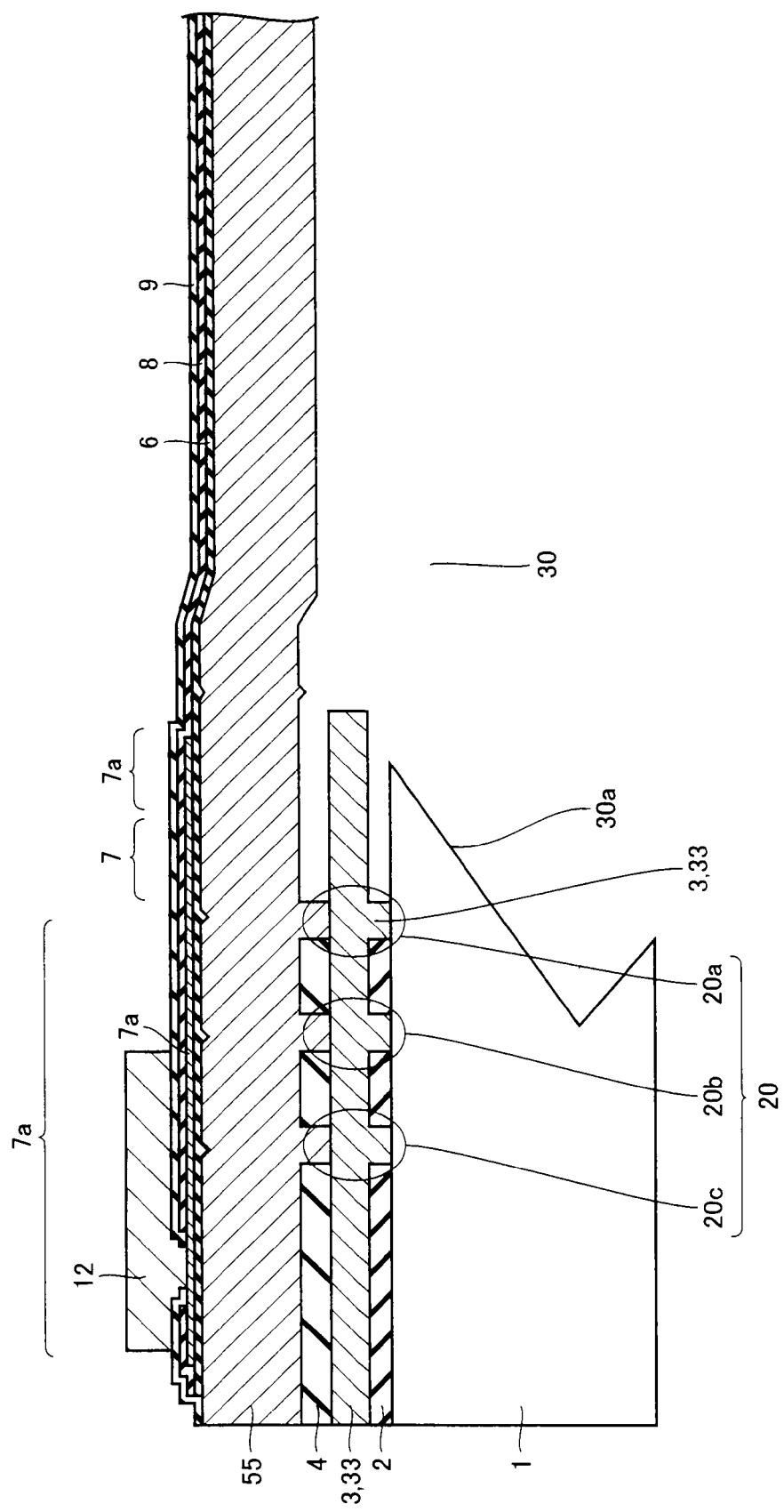
FIG. 22 is a sectional view taken along the sectional line XXII-XXII shown in FIG. 21 according to the fifth embodiment.

A semiconductor pressure sensor with no anchor portion located in a region where a gauge resistor is formed will now be described. As shown in FIGS. 21 and 22, gauge resistor 7 is located in a region other than the region where anchor portion 20 is located in a plan view (layout). Since the remaining structure is similar to that of the semiconductor pressure sensor shown in FIG. 20 and the like, like components are denoted by like reference characters, and description thereof will not be repeated.

As described in the fourth embodiment, generation of steps (recesses) may occur in the top face of doped polysilicon film 55 located above anchor portion 20, which will affect the accuracy in photolithography. Accordingly, to overcome the problem, the present semiconductor pressure sensor has gauge resistor 7 formed in a region other than the region where such recesses are likely to occur, in addition to providing a plurality of anchor portions as described in the fourth embodiment. Underlying doped polysilicon film 55 is thus flat in the region where gauge resistor 7 is located, which can prevent degradation in accuracy of photolithography when forming gauge resistor 7 and the like.

Sixth Embodiment

Figure 23:
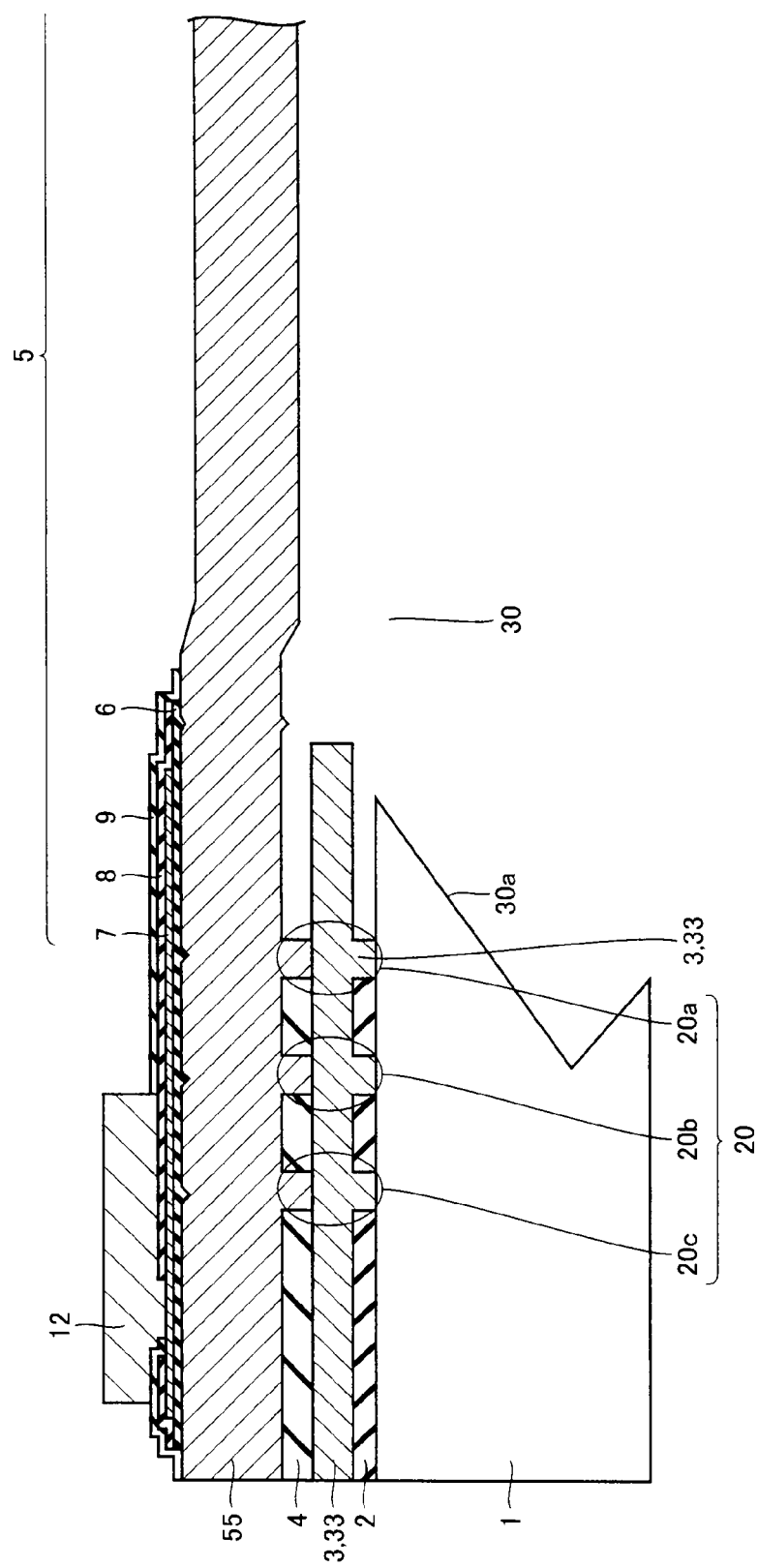
FIG. 23 is a partial sectional view of a semiconductor pressure sensor according to a sixth embodiment of the present invention.

A semiconductor pressure sensor will now be described in which a diaphragm is less affected by film stress of insulation films. As shown in FIG. 23, in the present semiconductor pressure sensor, portions of third insulation film 6, fourth insulation film 8 and fifth insulation film 9 formed on doped polysilicon film 55 are removed from a region located directly above diaphragm 5. Since the remaining structure is similar to that of the semiconductor pressure sensor shown in FIG. 20 and the like, like components are denoted by like reference characters, and description thereof will not be repeated.

In the region directly above diaphragm 5 in the present semiconductor pressure sensor, removal of the portions of stacked films of third insulation film 6, fourth insulation film 8 and fifth insulation film 9 can prevent doped polysilicon film 55 constituting diaphragm 5 from being affected by the film stress of these stacked films. Accordingly, the sensitivity in pressure sensing can be improved to achieve pressure sensing with higher accuracy.

Forming fourth insulation film 8 and fifth insulation film 9 in a manner covering gauge resistor 7 and the like provided on third insulation film 6 can reduce variations in resistance of gauge resistor 7.

Seventh Embodiment

Figure 24:
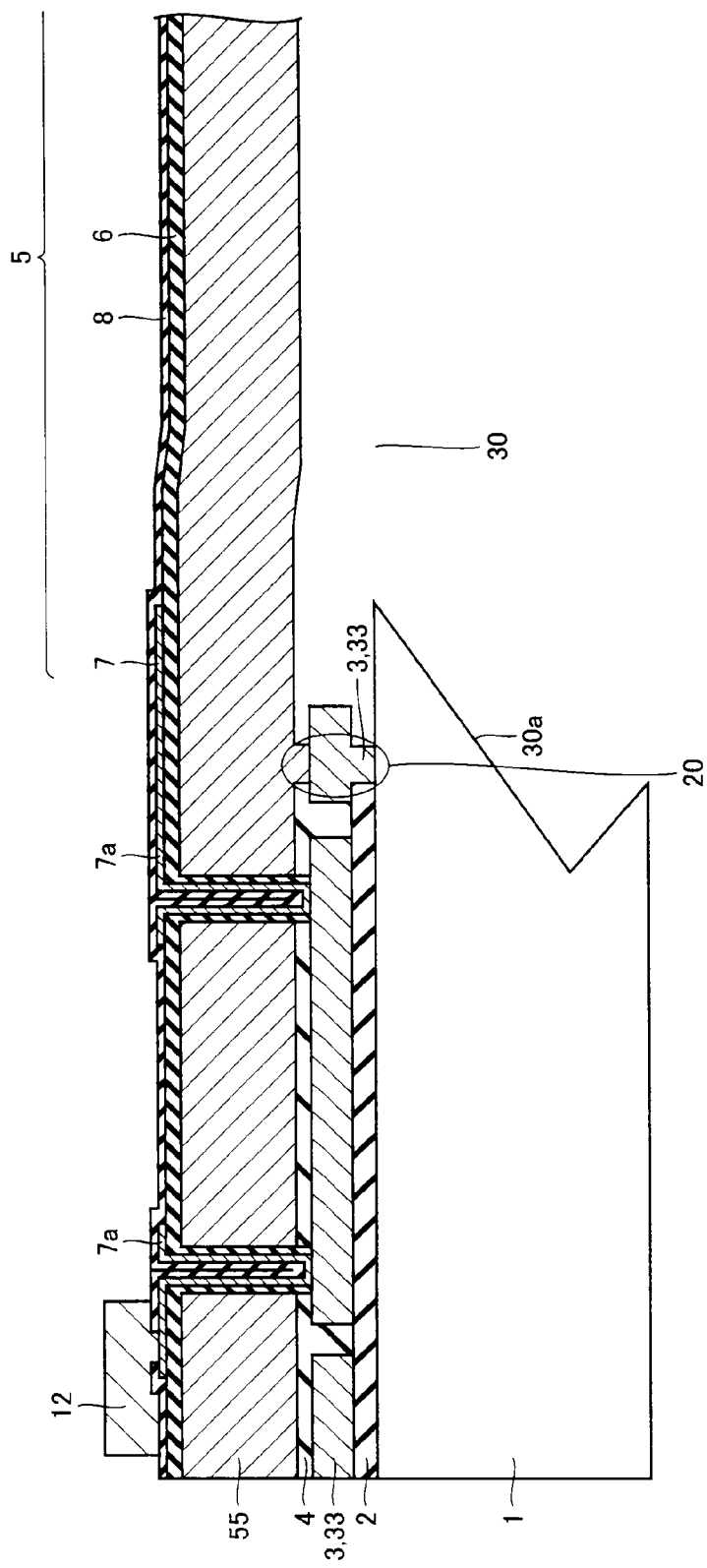
FIG. 24 is a partial sectional view of a semiconductor pressure sensor according to a seventh embodiment of the present invention.

A semiconductor pressure sensor will now be described in which a doped polysilicon film constituting a polysilicon sacrificial film functions as part of an interconnection. As shown in FIG. 24, gauge resistor 7 and aluminum pad 12 are electrically connected through polysilicon interconnection 7a formed on doped polysilicon film 55 and through doped polysilicon film 33 constituting polysilicon sacrificial film 3 located below doped polysilicon film 55. Doped polysilicon film 33 shall have an impurity concentration of about $1 \times 10^{19}$ to $1 \times 10^{21}/cm^3$.

A portion of polysilicon interconnection 7a connected to gauge resistor 7 is electrically connected to doped polysilicon film 33 via a through hole extending through doped polysilicon film 55. Another portion of polysilicon interconnection 7a connected to aluminum pad 12 is electrically connected to doped polysilicon film 33 via another through hole extending through doped polysilicon film 55. Since the remaining structure is similar to that of the semiconductor pressure sensor shown in FIG. 1 and the like, like components are denoted by like reference characters, and description thereof will not be repeated.

Setting gauge resistor 7 to have an optimum piezoresistance effect will increase the resistance of polysilicon interconnection 7a. On the other hand, considering doping of boron (B), for example, for reducing the resistance of polysilicon interconnection 7a alone, an additional doping step will be required. In addition, the wiring resistance may vary due to the difficulty in controlling the lateral diffusion of doped boron.

Accordingly, in the present semiconductor pressure sensor, doped polysilicon film 33 constituting polysilicon sacrificial film 3 functions as part of the interconnection. Since doped polysilicon film 33 has a resistance lower than that of the polysilicon film, the wiring resistance can be reduced.

Eighth Embodiment

Figure 25:
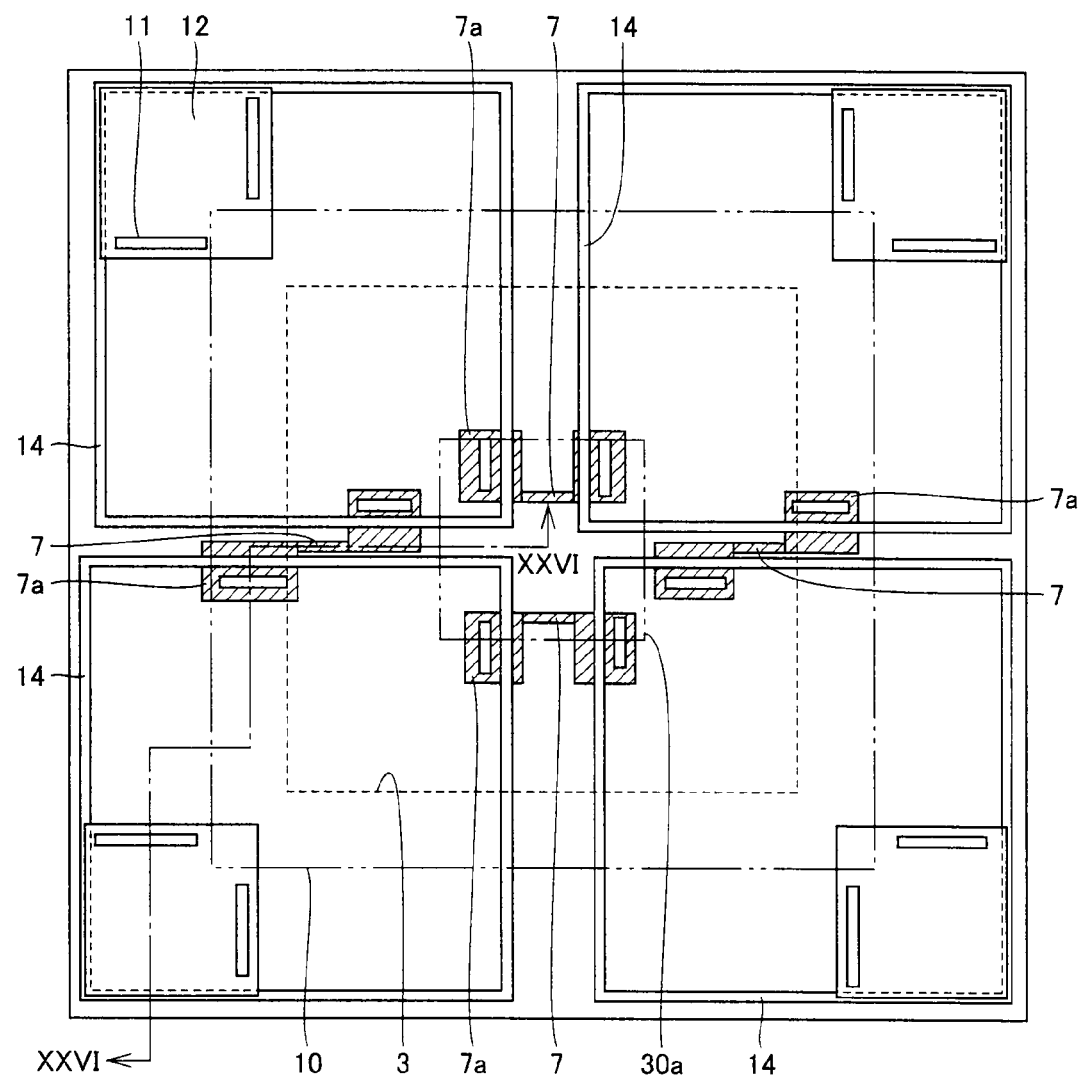
FIG. 25 is a plan view of a semiconductor pressure sensor according to an eighth embodiment of the present invention.
Figure 26:
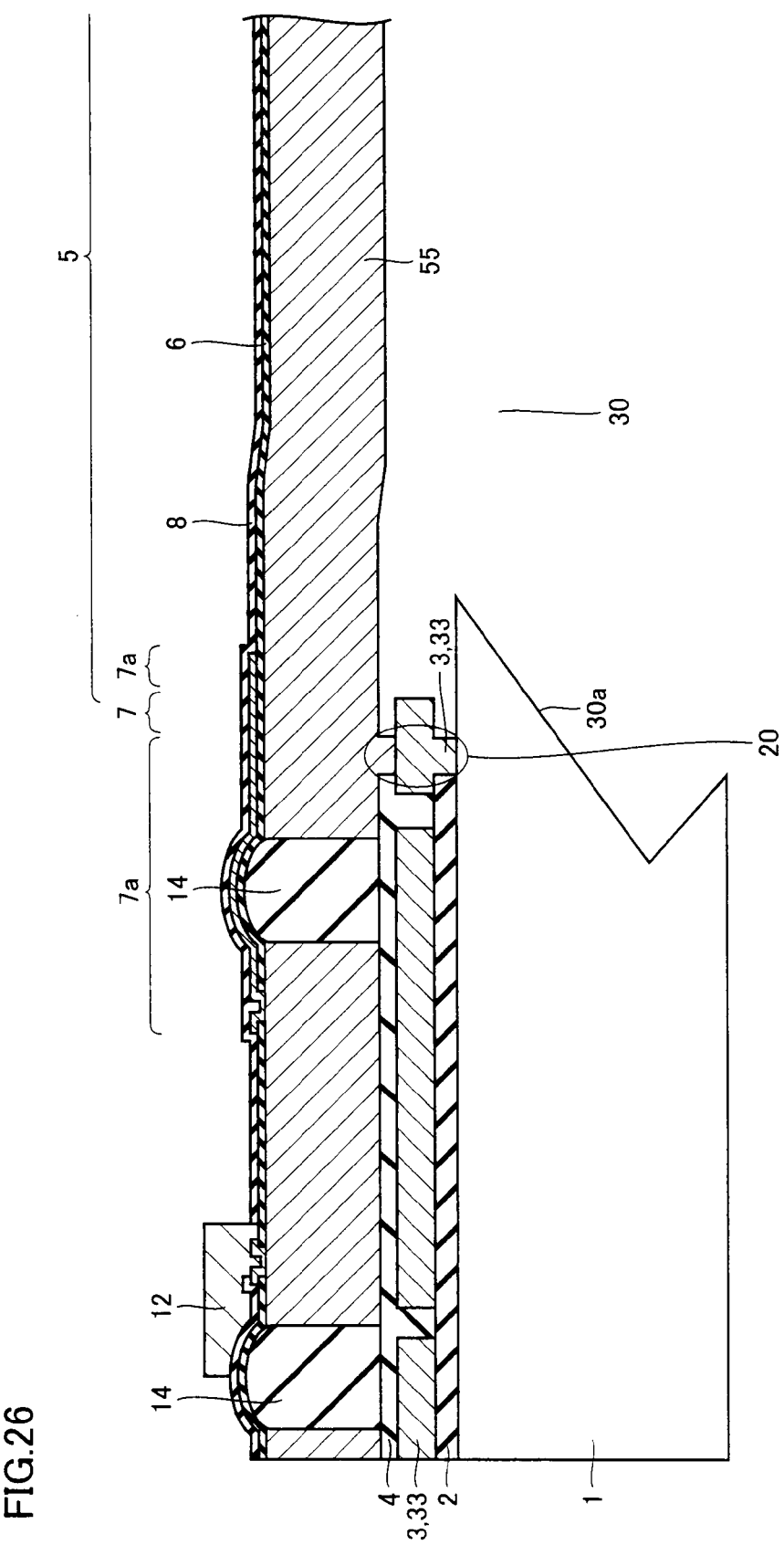
FIG. 26 is a sectional view taken along the sectional line XXVI-XXVI shown in FIG. 25 according to the eighth embodiment.

A semiconductor pressure sensor will now be described in which a doped polysilicon film constituting a diaphragm functions as part of an interconnection. As shown in FIGS. 25 and 26, gauge resistor 7 and aluminum pad 12 are electrically connected through polysilicon interconnection 7a provided on doped polysilicon film 55 and through doped polysilicon film 55 constituting the diaphragm.

A portion of polysilicon interconnection 7a connected to gauge resistor 7 is electrically connected to doped polysilicon film 55 via an opening formed in third insulation film 6. Another portion of polysilicon interconnection 7a connected to aluminum pad 12 is electrically connected to doped polysilicon film 33 via another opening formed in third insulation film 6. Isolation insulation film 14 is provided in a manner surrounding a portion of doped polysilicon film 55 to constitute part of the interconnection such that this portion is electrically isolated from the remaining portion of doped polysilicon film 55. Since the remaining structure is similar to that of the semiconductor pressure sensor shown in FIG. 1 and the like, like components are denoted by like reference characters, and description thereof will not be repeated.

As described above, reducing the resistance of the portion of polysilicon interconnection 7a other than the portion connected to gauge resistor 7 requires an additional doping step, and may cause variations in wiring resistance. Therefore, in the present semiconductor pressure sensor, doped polysilicon film 55 constituting diaphragm 5 also functions as part of an interconnection. Since doped polysilicon film 55 has a resistance lower than that of the polysilicon film, the wiring resistance can be reduced.

Ninth Embodiment

Figure 27:
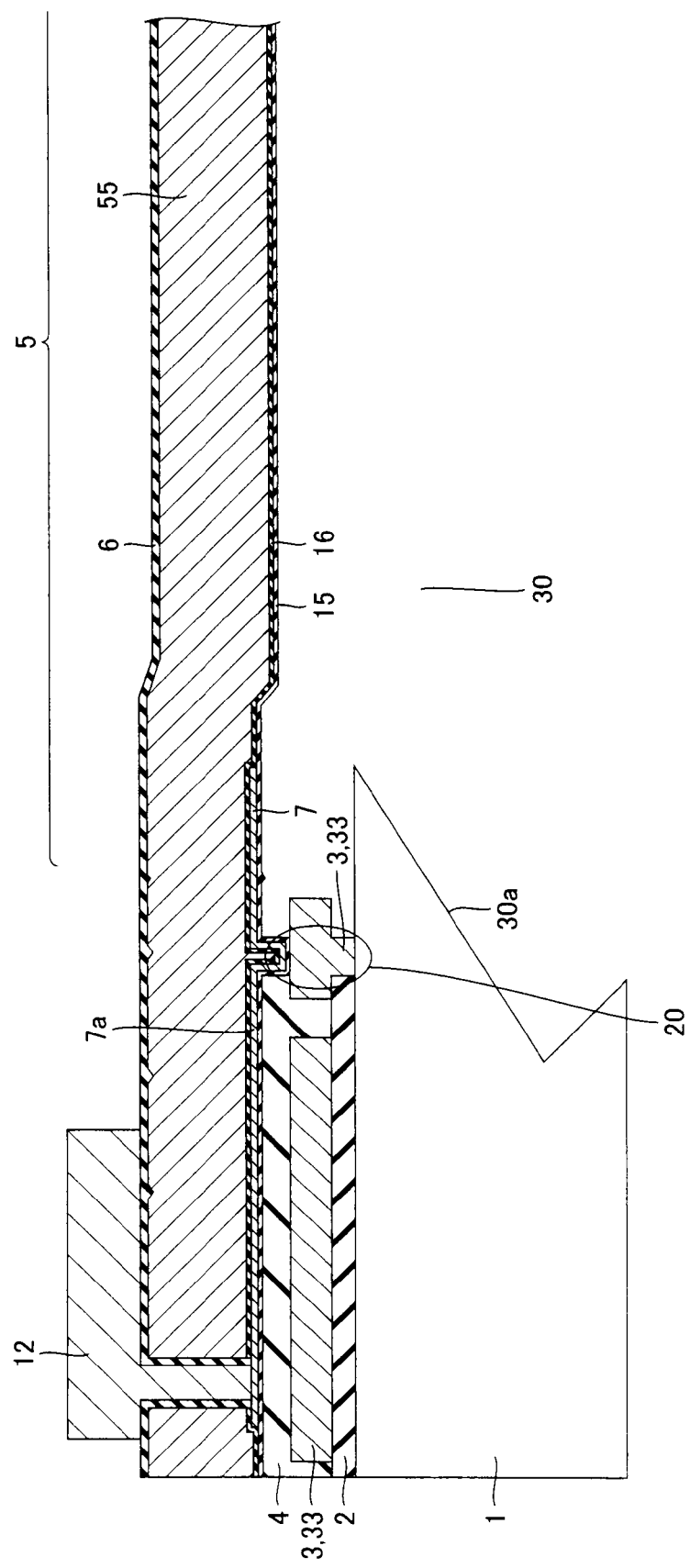
FIG. 27 is a partial sectional view of a semiconductor pressure sensor according to a ninth embodiment of the present invention.

A semiconductor pressure sensor will now be described in which a gauge resistor is covered by a doped polysilicon film to constitute a diaphragm. As shown in FIG. 27, gauge resistor 7 and polysilicon interconnection 7a are located between doped polysilicon film 55 to constitute diaphragm 5 and polysilicon sacrificial film 3 (doped polysilicon film 33).

Second insulation film 4 and sixth insulation film 15 are formed on polysilicon sacrificial film 3. Gauge resistor 7 and polysilicon interconnection 7a are formed on the top face of sixth insulation film 15. Seventh insulation film 16 is formed in a manner covering gauge resistor 7 and polysilicon interconnection 7a. Doped polysilicon film 55 is further formed in a manner covering seventh insulation film 16. Since the remaining structure is similar to that of the semiconductor pressure sensor shown in FIG. 1 and the like, like components are denoted by like reference characters, and description thereof will not be repeated.

In the present semiconductor pressure sensor, doped polysilicon film 55 to constitute diaphragm 5 is formed with seventh insulation film 16, covering gauge resistor 7 and polysilicon interconnection 7a, being interposed between insulation film 15 and doped polysilicon film 55. Accordingly, at the bottom face of doped polysilicon film 55, gauge resistor 7 has a portion located above the bottom of doped polysilicon film 55. In other words, gauge resistor 7 is partially buried in doped polysilicon film 55.

Since gauge resistor 7 is partially buried in doped polysilicon film 55, gauge resistor 7 receives a greater stress than in the case of providing the gauge resistor only on the surface of doped polysilicon film 55. Consequently, pressure sensing can be achieved with higher accuracy.

Tenth Embodiment

Figure 28:
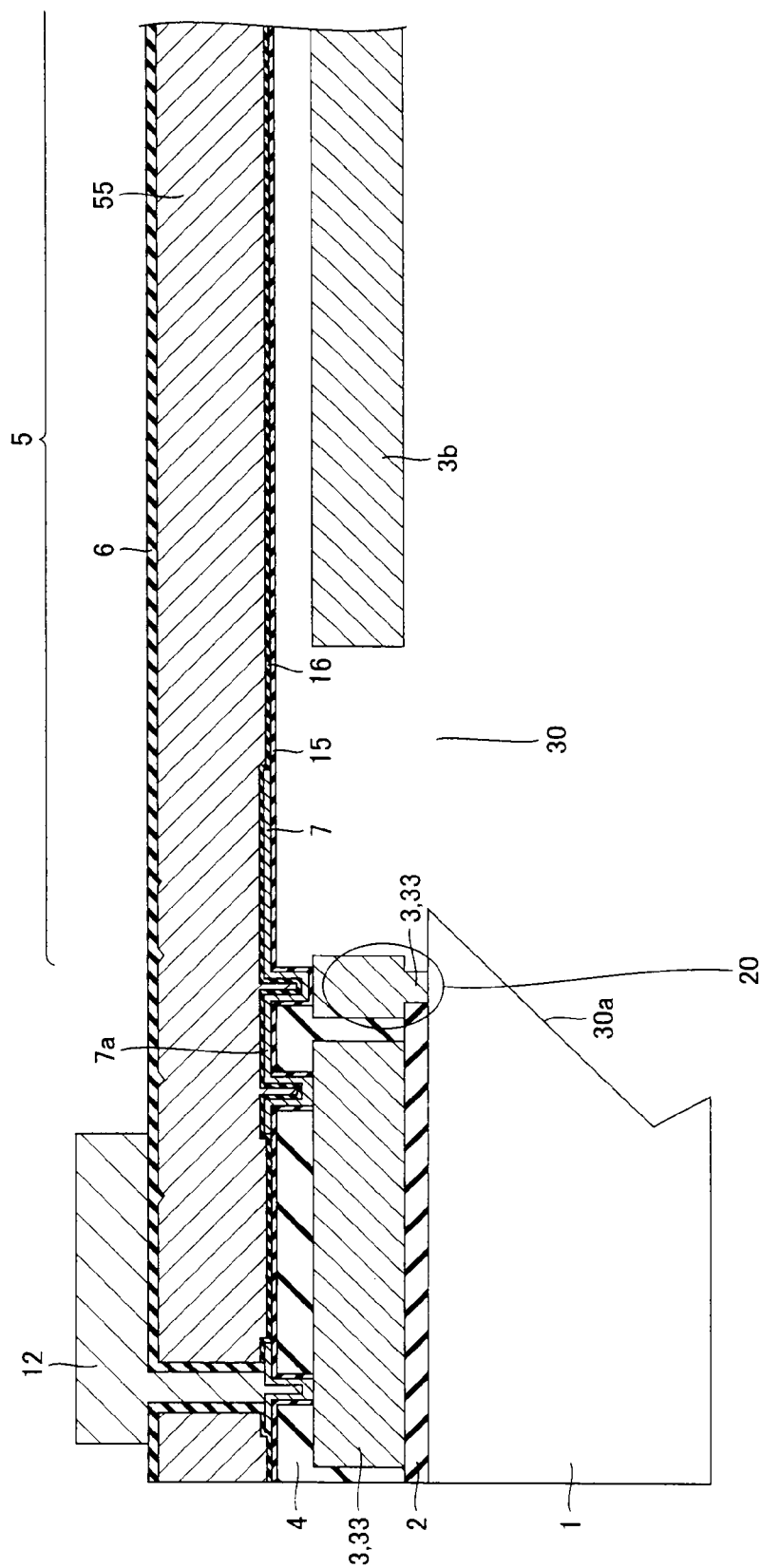
FIG. 28 is a partial sectional view of a semiconductor pressure sensor according to a tenth embodiment of the present invention.

A semiconductor pressure sensor having a polysilicon stopper will now be described. As shown in FIG. 28, a polysilicon stopper 3b made of a polysilicon film is arranged at a distance from diaphragm 5 at the side facing through hole 30 (silicon substrate 1). Polysilicon stopper 3b is made of polysilicon sacrificial film 3 and is supported on a predetermined portion (not shown) of silicon substrate 1. Since the remaining structure is similar to that of the semiconductor pressure sensor shown in FIG. 26 and the like, like components are denoted by like reference characters, and description thereof will not be repeated.

Since the polysilicon film constituting the gauge resistor has a piezoresistance coefficient lower than that of a diffused gauge resistor formed by diffusing impurities, the ratio (S/T) between the area (S) and the thickness (T) of the diaphragm needs to be increased in value. For example, in a 1-atm-pressure-specified semiconductor pressure sensor, the gauge resistor made of the polysilicon film may cause the diaphragm to have an insufficient strength, assuming a pressure guaranteed value at which the diaphragm is not damaged to be 10 atm pressure.

Accordingly, even when a relatively great pressure is applied to diaphragm 5 made of doped polysilicon film 55 to displace diaphragm 5, the provision of polysilicon stopper 3b for the present semiconductor pressure sensor allows diaphragm 5 to come into contact with polysilicon stopper 3b. Diaphragm 5 can thus be prevented from being displaced any further. Consequently, damage to the diaphragm can be prevented.

Although, in the present semiconductor pressure sensor, diaphragm 5 is provided with polysilicon stopper 3b at the side facing through hole 30 (silicon substrate 1), by way of example, diaphragm 5 may be provided with a polysilicon stopper at the opposite side of silicon substrate 1, or may be provided with polysilicon stoppers on both sides.

Eleventh Embodiment

Figure 29:
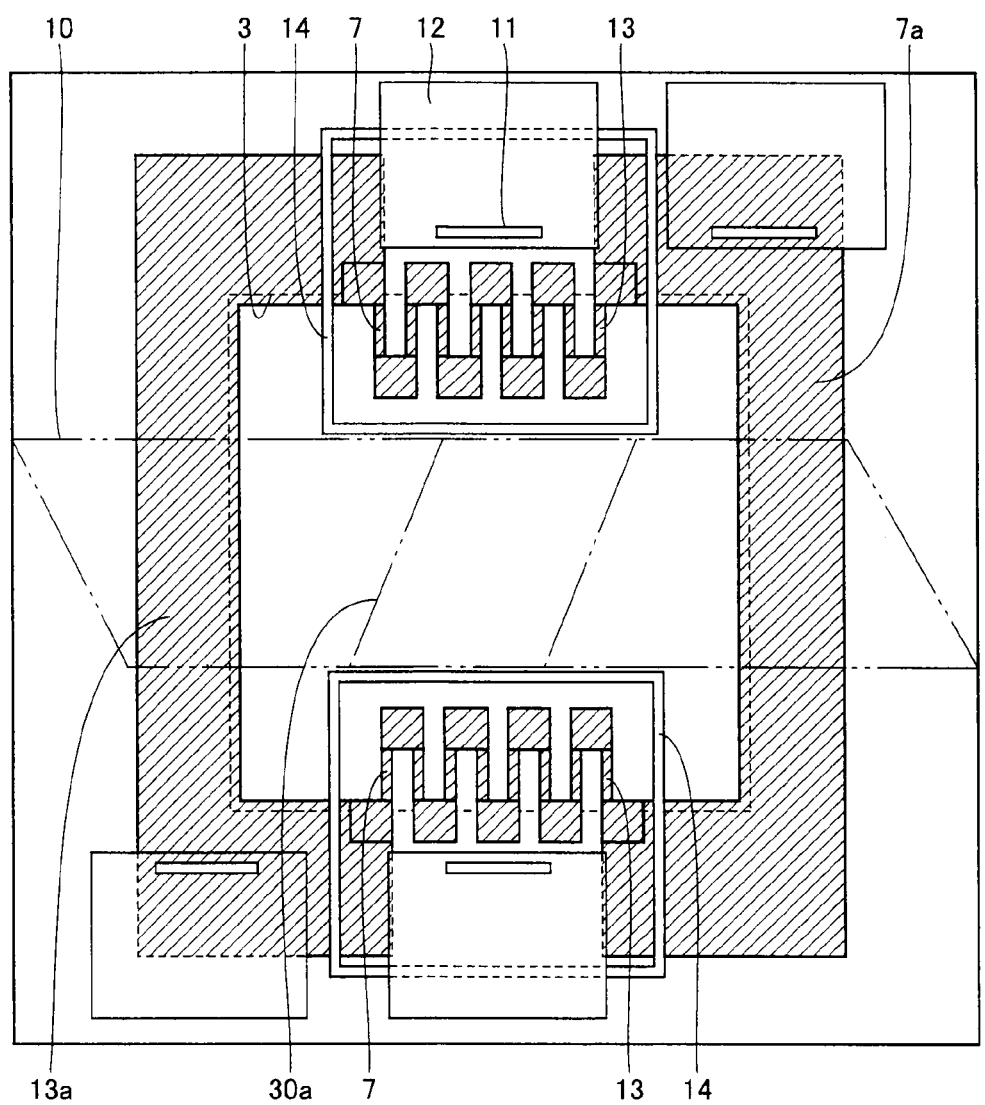
FIG. 29 is a plan view of a semiconductor pressure sensor according to an eleventh embodiment of the present invention.

A semiconductor pressure sensor will now be described to which a silicon substrate having a (110) crystal orientation is applied. As shown in FIG. 29, silicon substrate 1 having a (110) crystal orientation is applied as a silicon substrate on which a diaphragm is mounted. Since the remaining structure is similar to that of the semiconductor pressure sensor shown in FIG. 9 and the like, like components are denoted by like reference characters, and description thereof will not be repeated.

Figure 30:
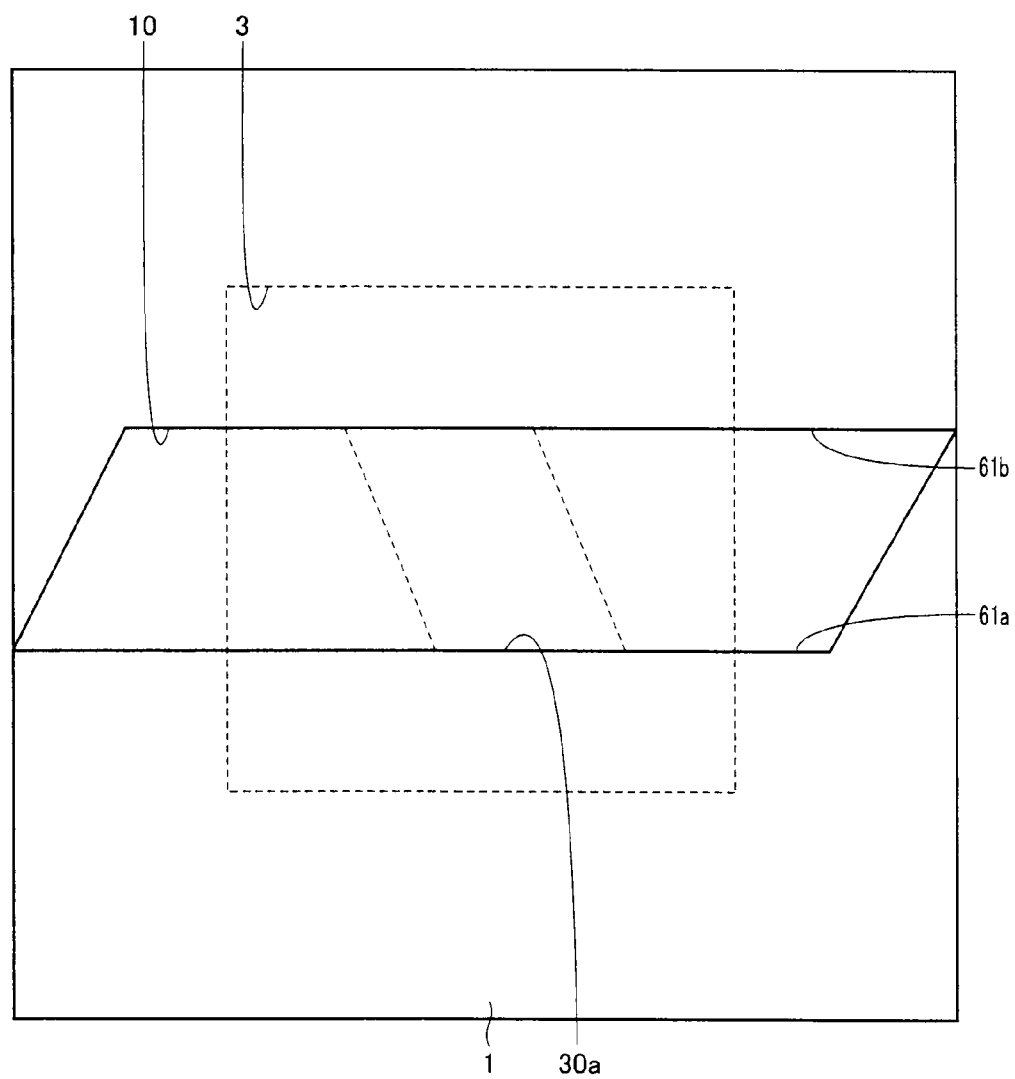
FIG. 30 is a plan view of a step in a method of producing the semiconductor pressure sensor according to the eleventh embodiment.

As shown in FIG. 30, in silicon substrate 1 having a (110) crystal orientation, etching mask 10 having a parallelogram opening is used when etching silicon substrate 1 to form substrate through hole 30a. Through use of such etching mask 10, certain end faces 61a and 61b exposed at substrate through hole 30a can be processed perpendicularly to the front surface of silicon substrate 1. Accordingly, the etching mask for forming substrate through hole 30a has a smaller opening region than in the case where substrate through hole 30a has inclined sidewalls, resulting in further size reduction of the semiconductor pressure sensor.

Although the diaphragm is made of a doped polysilicon film, by way of example, in each of the above-described semiconductor pressure sensors, the doped polysilicon film may be replaced with an undoped polysilicon film, a silicon nitride film or a metal film, for example. In addition, although the gauge resistors are made of a polysilicon film, by way of example, a doped polysilicon film, silicon, a diffused resistor or the like may be applied instead.

Further, the semiconductor pressure sensor according to the present invention may be embodied by applying the features of the semiconductor pressure sensors described in the respective embodiments to each other. For example, a plurality of anchor portions described in the fourth embodiment can be applied to other semiconductor pressure sensors described in other embodiments. The semiconductor pressure sensor according to the present invention may effectively be applied to a measuring apparatus for sensing pressure or the like.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A semiconductor pressure sensor comprising:
   a substrate having a first main surface and a second main surface opposite to each other;
   a diaphragm provided above said first main surface of said substrate and made of a predetermined film;
   a gauge resistor for sensing strain in said diaphragm as a variation in electric resistance;
   a through hole extending through said substrate from said second main surface to said first main surface in a manner exposing a bottom face of said diaphragm; and
   an anchor portion made of an identical material to said predetermined film, and surrounding circumferentially an opening end of said through hole located at a side facing said first main surface for mounting said diaphragm on said first main surface of said substrate.

2. The semiconductor pressure sensor according to claim 1, wherein said gauge resistor is located on at least one of a top face of said predetermined film constituting said diaphragm, opposite to said first main surface, and the bottom face of said predetermined film located at the side facing said first main surface.

3. The semiconductor pressure sensor according to claim 1, wherein
   said gauge resistor extends with a predetermined width, and
   a dummy pattern having a width equal to said predetermined width is provided in a manner constituting a line-and-space pattern with said gauge resistor.

4. The semiconductor pressure sensor according to claim 1, comprising a plurality of said anchor portions including a first portion surrounding circumferentially the opening end of said through hole located at the side facing said first main surface and a second portion located on an outer side of said first portion.

5. The semiconductor pressure sensor according to claim 1, wherein said gauge resistor is located in a region other than a region located directly above said anchor portion.

6. The semiconductor pressure sensor according to claim 1, having a single-layer structure made of said predetermined film in a region other than a region of said diaphragm where said gauge resistor is located.

7. The semiconductor pressure sensor according to claim 1, further comprising:
   an electrode portion located at a predetermined position on said diaphragm for applying a predetermined voltage to said gauge resistor; and
   a conductive layer provided between said diaphragm and said substrate, wherein
   said gauge resistor and said electrode portion are electrically connected through said conductive layer.

8. The semiconductor pressure sensor according to claim 1, further comprising an electrode portion located in a predetermined position relative to said diaphragm for applying a predetermined voltage to said gauge resistor, wherein
   said diaphragm is conductive, and
   said gauge resistor and said electrode portion are electrically connected through said diaphragm.

9. The semiconductor pressure sensor according to claim 1, further comprising a stopper film arranged at a distance from the bottom face of said diaphragm toward the opening end of said through hole located at the side facing said first main surface.

10. The semiconductor pressure sensor according to claim 1, wherein a silicon substrate having a crystal orientation is applied as said substrate.

11. A method of producing a semiconductor pressure sensor, comprising the steps of:
   providing a substrate having a first main surface and a second main surface opposite to each other;
   providing, on said first main surface of said substrate, an insulation film different from said substrate in etching property;
   forming, in said insulation film, an opening for exposing said first main surface of said substrate in a manner surrounding circumferentially a predetermined region of said insulation film;
   providing a predetermined film to constitute a diaphragm on said insulation film in a manner filling said opening;
   providing a predetermined etching mask on a region of said second main surface of said substrate;
   etching said substrate with said predetermined etching mask interposed to form a through hole in a manner exposing a surface of a portion of said insulation film located in said predetermined region;
   forming said diaphragm by removing the portion of said insulation film located in said predetermined region to expose said predetermined film to constitute said diaphragm; and
   providing said diaphragm with a gauge resistor for sensing strain in said diaphragm as a variation in electric resistance.

12. The method according to claim 11, wherein in the step of providing said gauge resistor, a dummy pattern is provided in a manner constituting a line-and-space pattern with said gauge resistor, said gauge resistor extending with a predetermined width, and said dummy pattern having a width equal to said predetermined width.

13. The method according to claim 11, wherein
a silicon substrate having a crystal orientation is applied as said substrate, and
in the step of providing said predetermined etching mask, said predetermined etching mask has a parallelogram opening.

\* \* \* \* \*